(12) United States Patent
Rhoades et al.

(10) Patent No.: US 12,259,054 B2
(45) Date of Patent: Mar. 25, 2025

(54) EQUALIZATION SHUTOFF VALVE

(71) Applicant: NIFCO AMERICA CORP., Canal Winchester, OH (US)

(72) Inventors: William Russell Rhoades, Columbus, OH (US); Christopher Keegan Bulger, Hilliard, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 0 days.

(21) Appl. No.: 18/373,489

(22) Filed: Sep. 27, 2023

(65) Prior Publication Data

US 2024/0102575 A1     Mar. 28, 2024

Related U.S. Application Data

(60) Provisional application No. 63/410,696, filed on Sep. 28, 2022.

(51) Int. Cl.
| | |
|---|---|
| *F16K 27/02* | (2006.01) |
| *F16K 1/38* | (2006.01) |
| *F16K 1/46* | (2006.01) |
| *F16K 17/04* | (2006.01) |

(52) U.S. Cl.
CPC ......... *F16K 27/0254* (2013.01); *F16K 1/385* (2013.01); *F16K 1/46* (2013.01); *F16K 17/04* (2013.01)

(58) Field of Classification Search
CPC ........ F16K 27/0254; F16K 1/385; F16K 1/46; F16K 17/04; H01M 50/308; H01M 50/325; H01M 50/333; H01M 50/30; Y02E 60/10
See application file for complete search history.

(56) References Cited

U.S. PATENT DOCUMENTS

| | | | | |
|---|---|---|---|---|
| 5,538,807 | A | * 7/1996 | Hagiuda | H01M 50/325 429/100 |
| 2016/0036025 | A1 | * 2/2016 | Hofer | H01M 50/325 429/56 |
| 2016/0327171 | A1 | * 11/2016 | Seidl | F16K 15/025 |

* cited by examiner

*Primary Examiner* — Patrick C Williams
(74) *Attorney, Agent, or Firm* — HAUPTMAN HAM, LLP

(57) ABSTRACT

An equalization shutoff valve includes a housing having an outward extending flange around an open end of the housing, retaining clips attached to the flange configured to engage a battery pack compartment, and piston guides disposed inside the housing; a piston having guide notches engaging the piston guides, and a first flow port; a spring disposed between the housing and the piston to urge the piston in a direction away from a closed end of the housing; and a locking tab cover attached to the housing with the piston inside the housing, and having a second flow port and locking tabs with clip ports. The housing is attached to the battery pack compartment through the retaining clips so that air flows from inside the battery pack compartment, and when pressure inside the housing increases, increased pressure pushes the spring and the piston to allow air to exit from the housing.

3 Claims, 54 Drawing Sheets

EQUALIZATION SHUTOFF VALVE

FIELD OF THE INVENTION

The present application relates to an equalization shutoff valve, in particular, to close off an equalization membrane during an over pressurized condition within a vehicle battery pack.

BACKGROUND OF THE INVENTION

An electric vehicle battery can generate gas during use. If the gas is not discharged in time and accumulates in a battery pack, the pressure inside the battery pack will increase, which will affect the battery pack and may cause a thermal run away. Therefore, in manufacturing a battery, it is necessary to mount a pressure relief device on the battery pack. If the pressure in the battery pack is higher than a predetermined value, the pressure relief device will be automatically opened to discharge the gas accumulated in the battery pack to relieve the excessive pressure therein.

It is also necessary to install a membrane to keep the pressure inside the battery pack equal to the pressure outside the battery pack to normalize the pressure. This membrane can allow gases to escape from the battery pack along with the pressure relief valve during pressure accumulation period.

SUMMARY OF THE INVENTION

The present invention provides for an equalization shutoff valve.

In one aspect of the invention, an equalization shutoff valve comprises a housing having a cylindrical shape with a closed end, a vent port in the closed end and an open end at a side opposite to the closed end, the housing including an outward extending flange around the open end, retaining clips attached to the flange configured to engage a battery pack compartment, and piston guides disposed inside the housing; a piston having a cylindrical shape and disposed inside the housing, the piston having guide notches engaging the piston guides, and a first flow port; a spring disposed between the housing and the piston to urge the piston in a direction away from the closed end of the housing; and a locking tab cover attached to the housing with the piston inside the housing, and having a second flow port and locking tabs with clip ports, one retaining clip passing through one clip port.

The housing assembled with the piston, the spring and the locking tab cover is configured to be attached to the battery pack compartment through the retaining clips so that air flows from inside the battery pack compartment through the second flow port of the locking tab cover into the first flow port of the piston. When the pressure inside the housing increases, increased pressure pushes the spring and the piston to allow air to exit from the housing.

In another aspect of the invention, an equalization shutoff valve comprises a housing having a cylindrical shape with a closed end, a vent port in the closed end and an open end at a side opposite to the closed end, and including an outward extending flange around the open end, guide channels disposed inside the housing, and clip retainers formed around the open end and configured to engage a battery pack compartment; a piston having a cylindrical shape and disposed inside the housing, the piston having clip pockets formed around the piston, and retaining clips each being disposed in each of the clip pockets so that each retaining clip bends inwardly of the piston when being pushed inwardly; and a spring disposed between the housing and the piston to urge the piston in a direction away from the closed end of the housing.

The hosing with the piston and the spring therein is configured to be attached to the battery pack compartment through the clip retainers so that air flows from inside the battery pack compartment through the clip pocket, and when pressure inside the housing increases, increased pressure pushes the spring and the piston to allow air to exit from the housing.

In the present invention, the gas in the battery pack compartment can be properly released when the pressure is increased.

DETAILED DESCRIPTION OF THE INVENTION

The present invention will be explained with reference to the specific embodiment of the invention. The following detailed description is exemplary in nature and is not intended to limit application and uses. Furthermore, there is no intention to be bound by any theory presented by the following detail.

Figure 1:
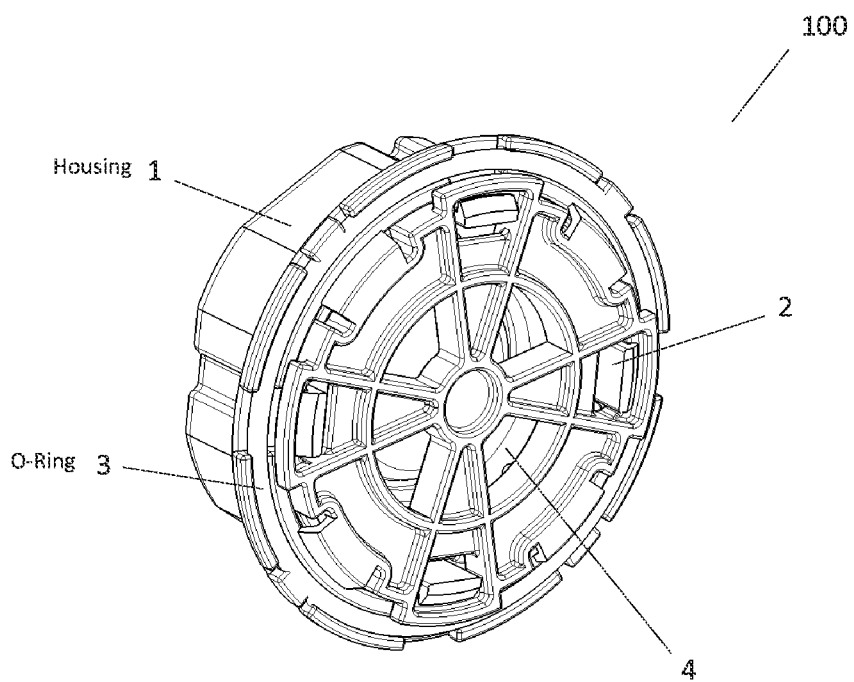
FIG. 1 shows an isometric front view of an equalization shutoff valve of the invention.
Figure 2:
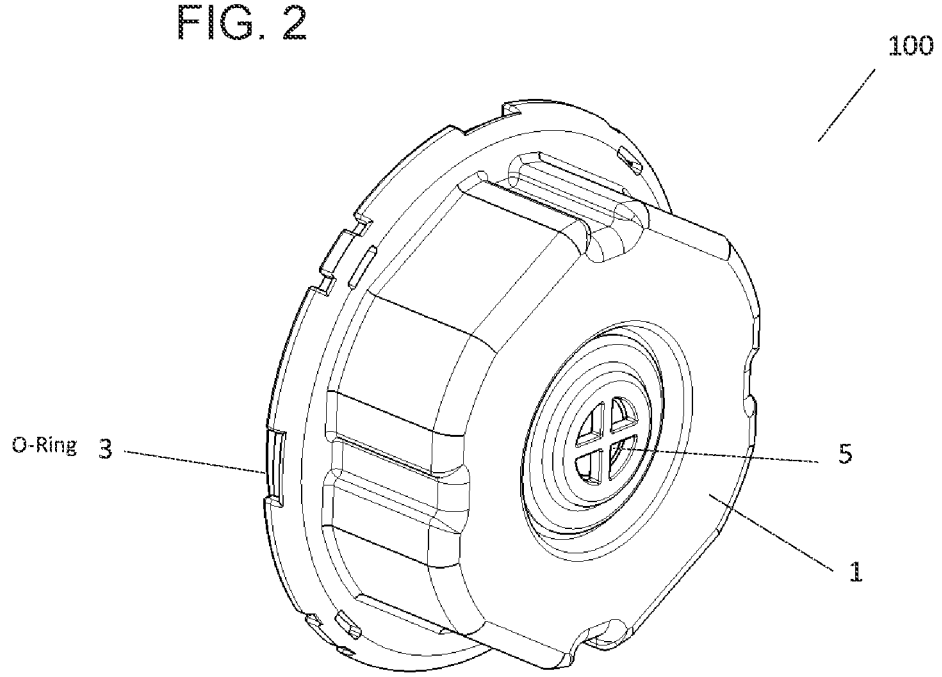
FIG. 2 shows an isometric rear view of the equalization shutoff valve.
Figure 3:
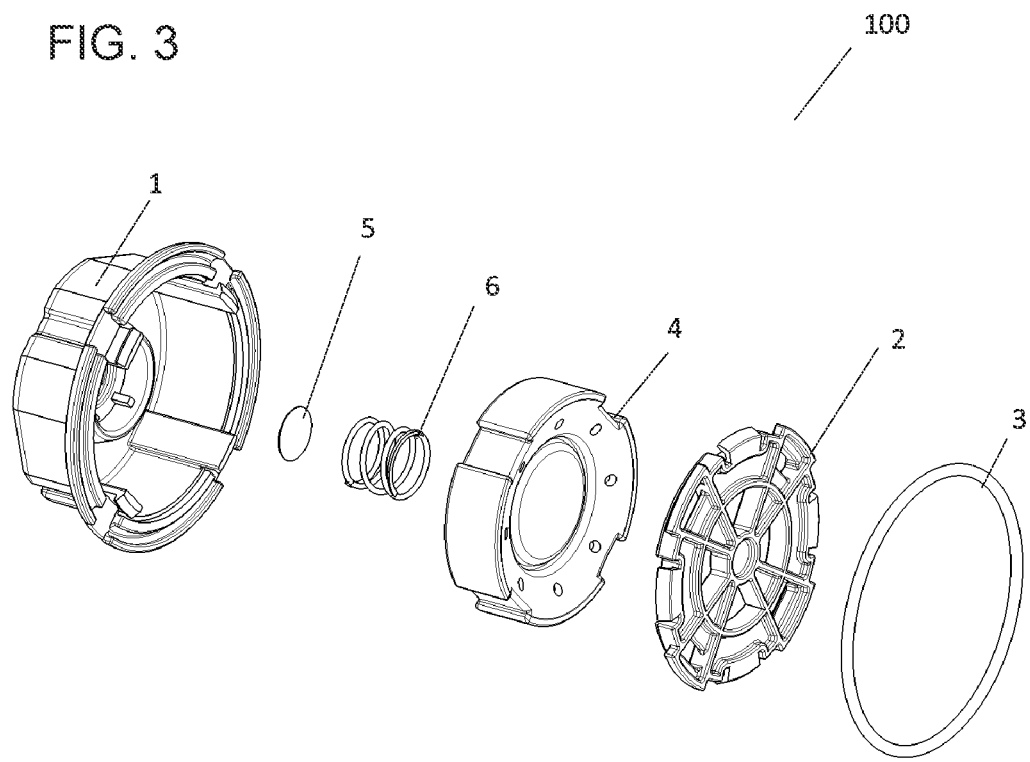
FIG. 3 shows an exploded isometric view of the equalization shutoff valve.

FIG. 1 and FIG. 3 show components of the equalization shutoff valve 100. These components comprises a hosing 1, a piston 4, a locking tab cover 2, an O-ring 3, a spring 6 and a membrane 5.

Figure 4:
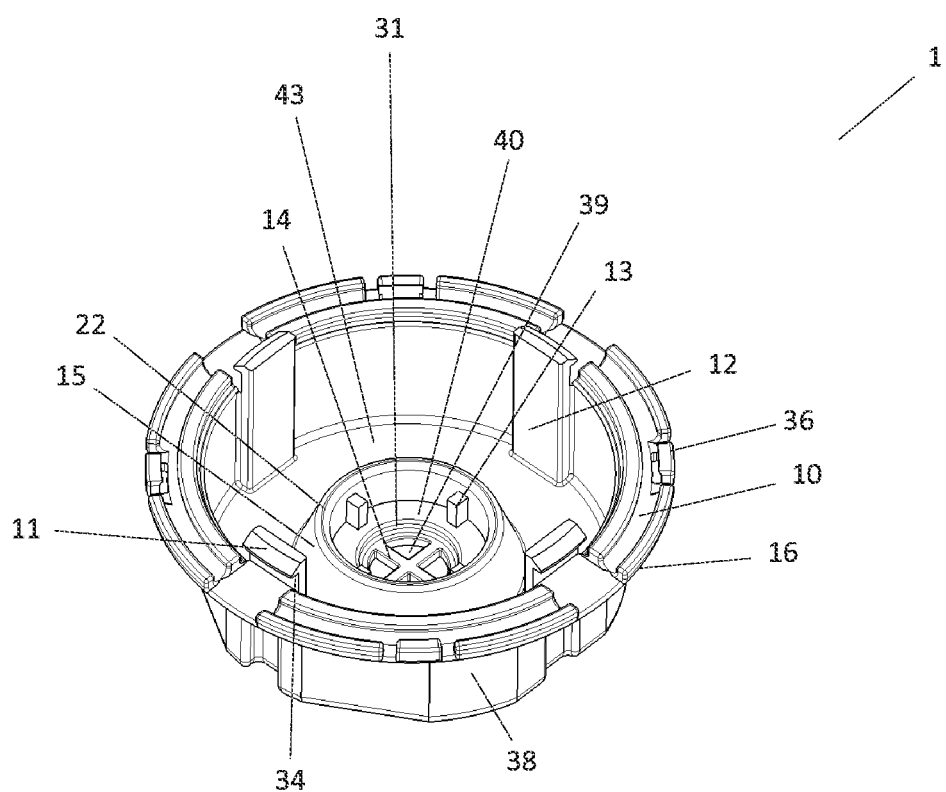
FIG. 4 shows an isometric front view of a housing of the equalization shutoff valve.
Figure 5:
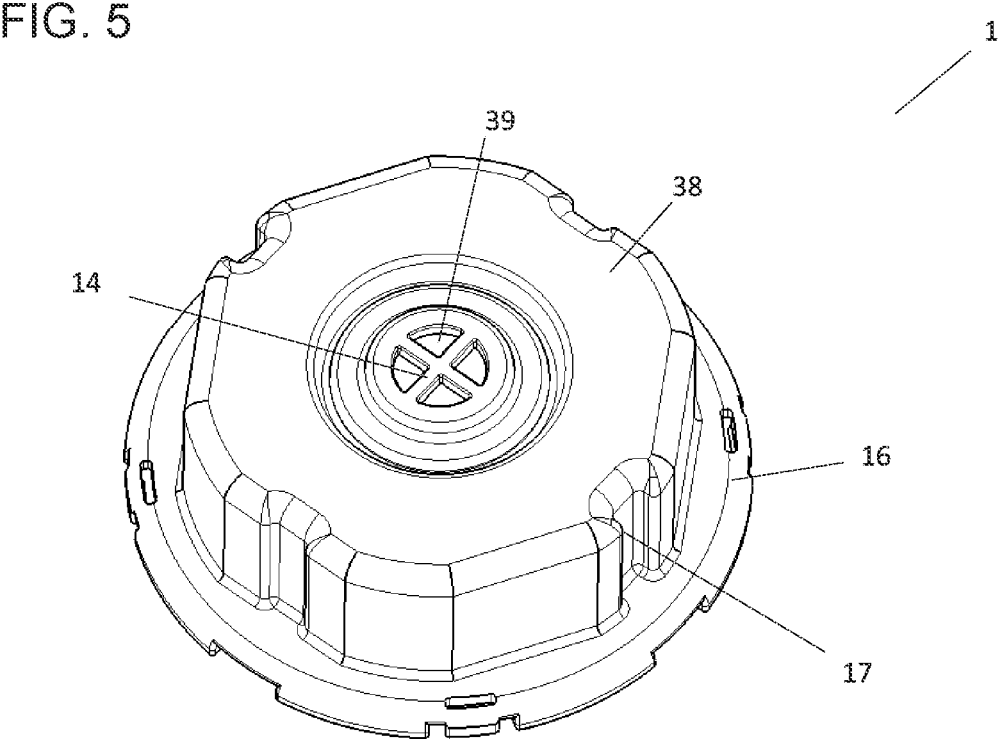
FIG. 5 shows an isometric rear view of the housing.

FIG. 4 and FIG. 5 show the housing 1 including a base 38, a flange 16 and retaining clips 11.

A base 38 has a cylindrical shape that is open on one end and closed on the other end. A closed end has a cone seal 22 protruding upwardly towards the open end while tapering towards the center of the tube. The center of the cone seal 22 is open to create a spring pocket 40. There are spring locators 13 positioned around the outside circumference of the spring pocket 40. In the center of the spring pocket 40, there is a recessed membrane surface 31 with vent ports 39 going through the closed end of the base 38. These vent ports 39 create a grid pattern that creates a rock guard 14.

The housing 1 includes a flange 16 sitting on the open end of the base 38 extending perpendicular from the center of the tubular base 38. An O-ring groove 10 is formed on the face of the flange 16, and O-ring retainers 36 are located around the flange 16 alongside the O-ring groove 10.

Retaining clips 11 are located at the end of piston guides 12 that run along the inner surface of the base 38 running parallel to the axis of the tubular structure from the closed end of the base 38 to above the top surface of the flange 16. Clipping features 34 extend outward from the ends of the retaining clips 11 over the O-ring groove 10 surfaces.

Figure 6:
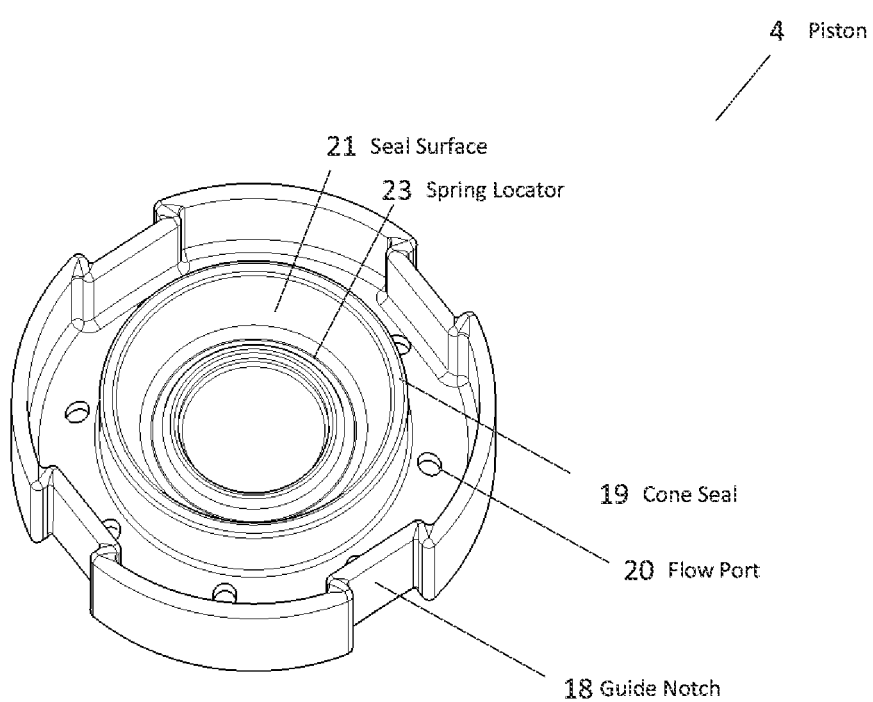
FIG. 6 shows an isometric rear view of a piston of the equalization shutoff valve.
Figure 7:
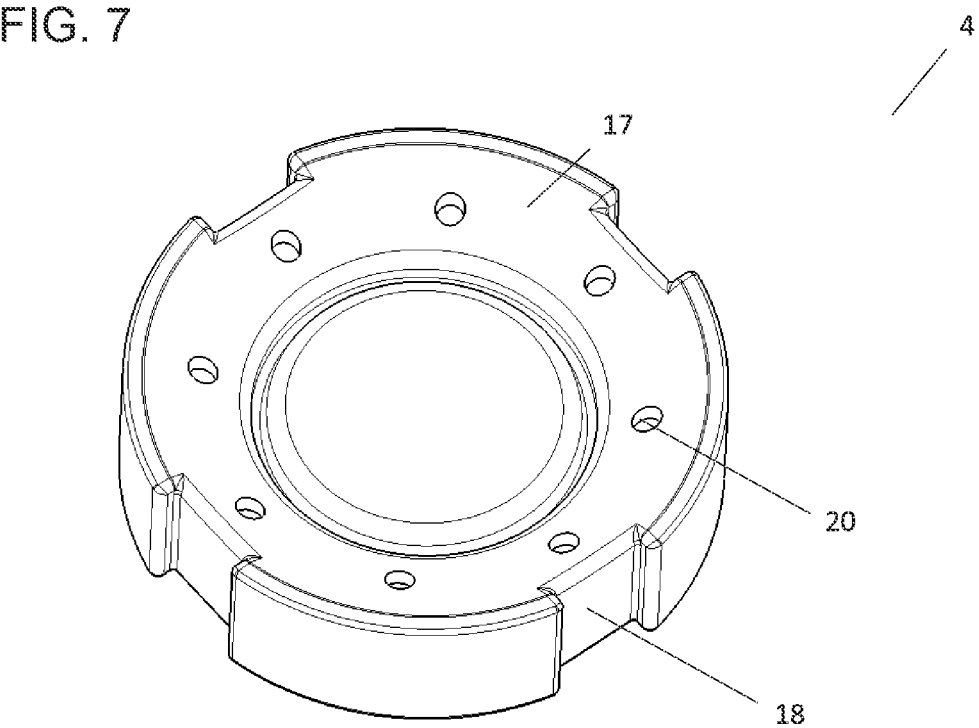
FIG. 7 shows an isometric front view of the piston.

FIG. 6 and FIG. 7 show the piston 4 which comprises a cylindrical tube with guide notches 18 running the full length with one end closed with a piston face 17 and open on the other end. The piston face 17 on the closed end is an inward facing concaved shape with a flat center portion. The piston face 17 includes flow ports 20 symmetrically located about the center of the cylindrical tube shape of the piston 4 on the concave angles. The other end of the piston 4 is open with a cylindrical tube cone seal 19 protruding from the back side of the piston face 17 up towards the open end of the piston 4. The inside portion of the cone seal 19 tapers inward towards the closed end of the piston 4 creating a seal surface 21 and a flat portion in the center of the cone seal 19. A circular protrusion extends upwardly from the bottom of the flat portion to create a spring locator 23.

Figure 8:
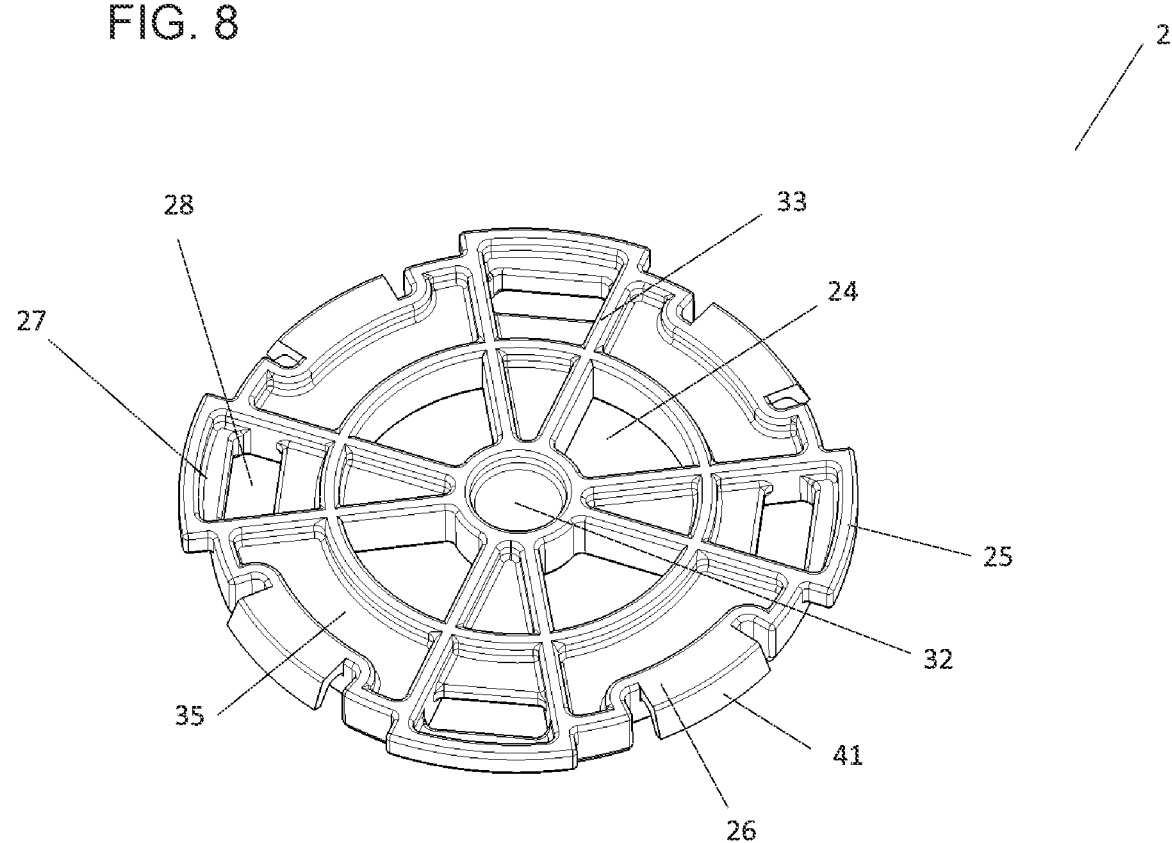
FIG. 8 shows an isometric front view of a locking tab cover of the equalization shutoff valve.
Figure 9:
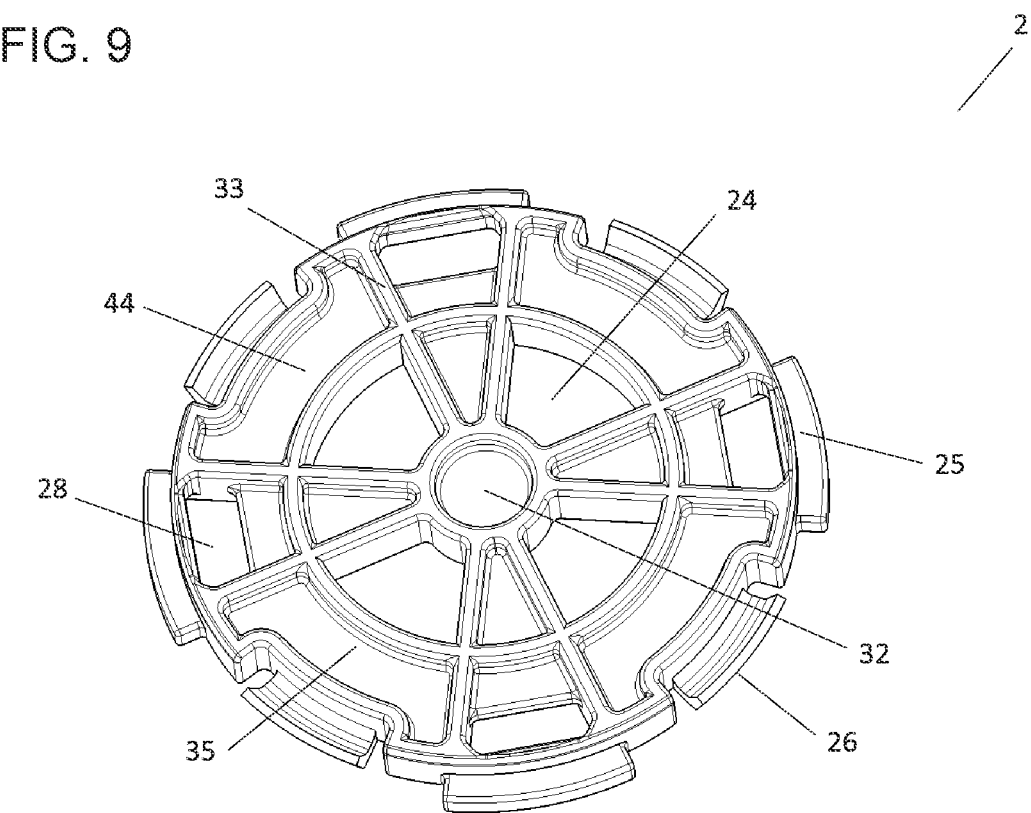
FIG. 9 shows an isometric rear view of the locking tab cover.

FIG. 8 and FIG. 9 show the locking tab cover 2 having a cylindrical disc shape with protruding locking tabs 25. Each locking tab 25 has a clip shelf 27 at a place away from the center of the disc shape with clip port 28 parallel to the clip shelf 27. Flexible anti-rotational tabs 26 are located between the locking tabs 25 around the perimeter of the disc shape. Structural ribs 33 extend outward from a central hub 32 around each of the locking tabs 25. An outer hub 35 is arranged between the central hub 32 and the outer portion of the locking tabs 25. Flow ports are located between the central hub 32 and outer hub 35 between the structural ribs 33 of the locking tabs 25.

Figure 10:
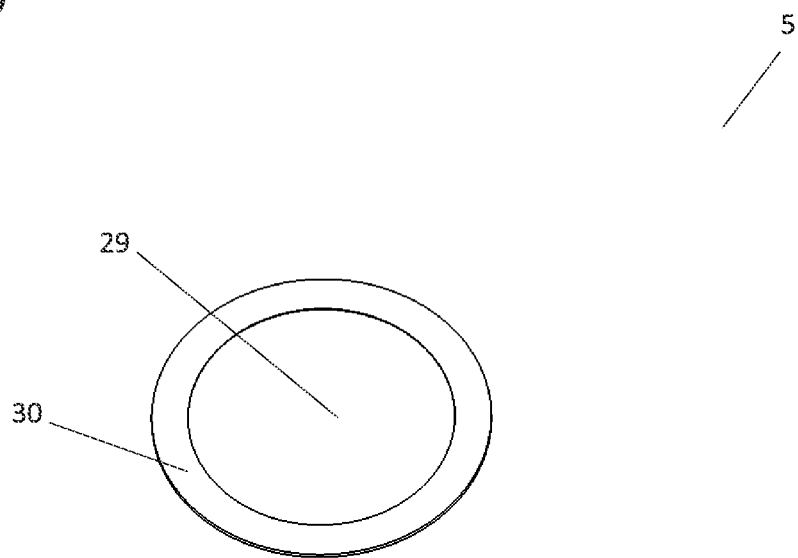
FIG. 10 shows an isometric view of a membrane of the equalization shutoff valve.
Figure 11:
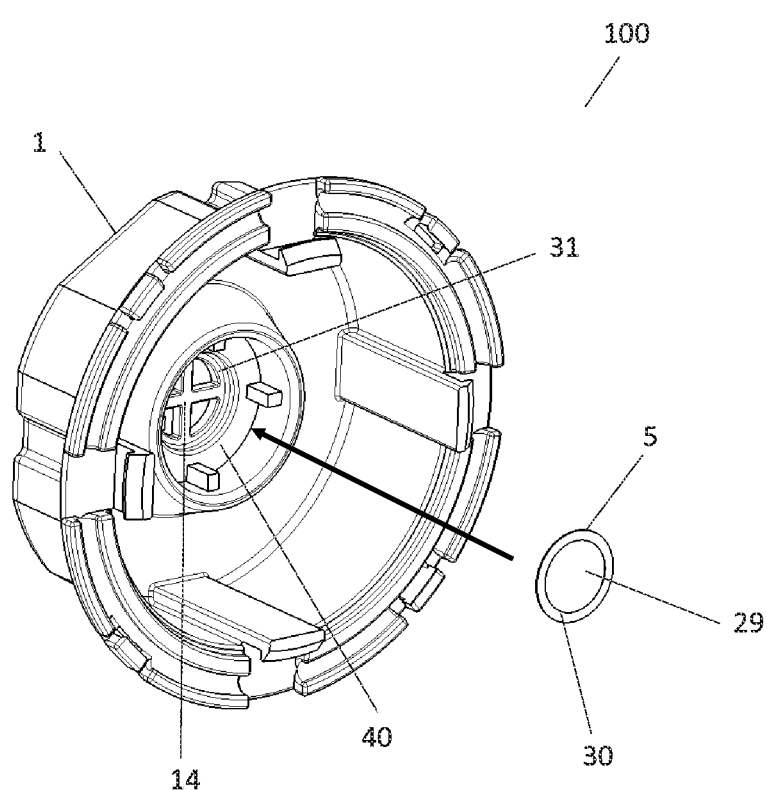
FIG. 11 shows an isometric view of the membrane being assembled.
Figure 12:
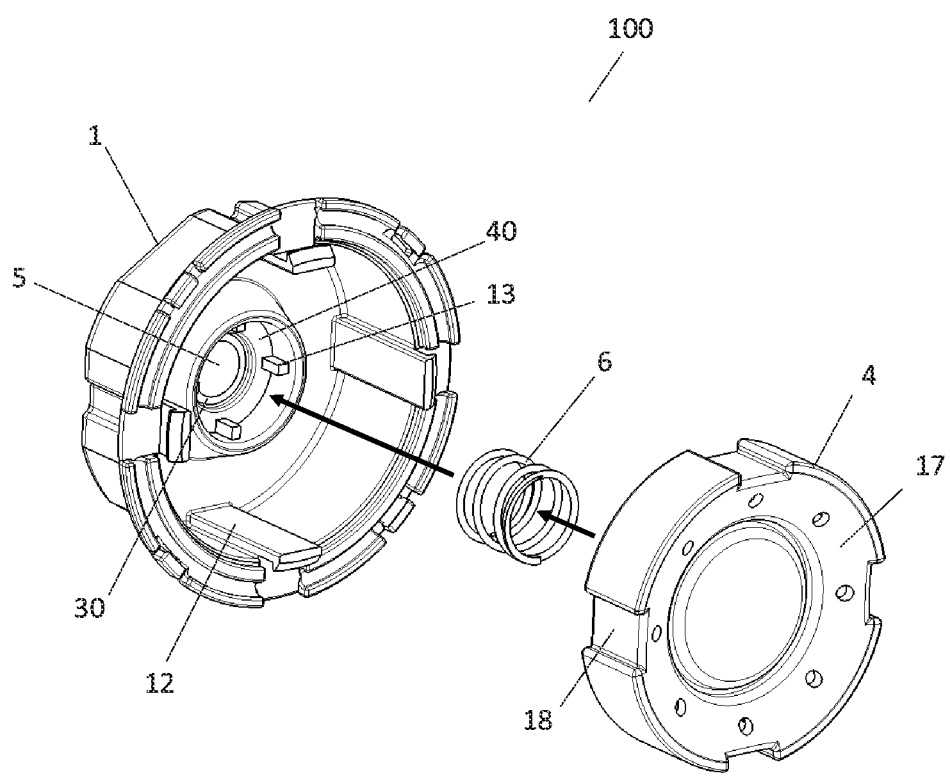
FIG. 12 shows an isometric view of the spring and piston being assembled.
Figure 13:
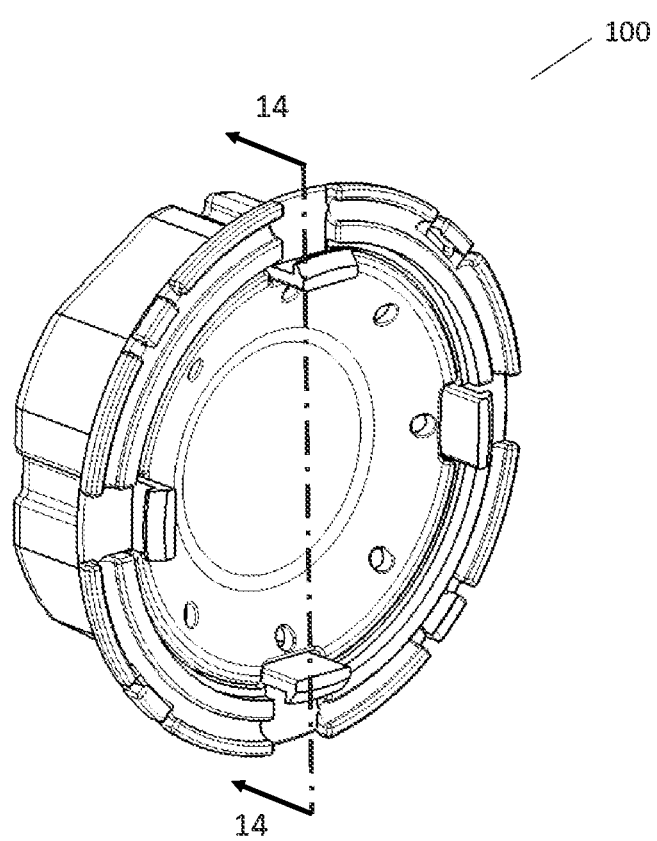
FIG. 13 shows an isometric view of the spring and piston assembled.
Figure 14:
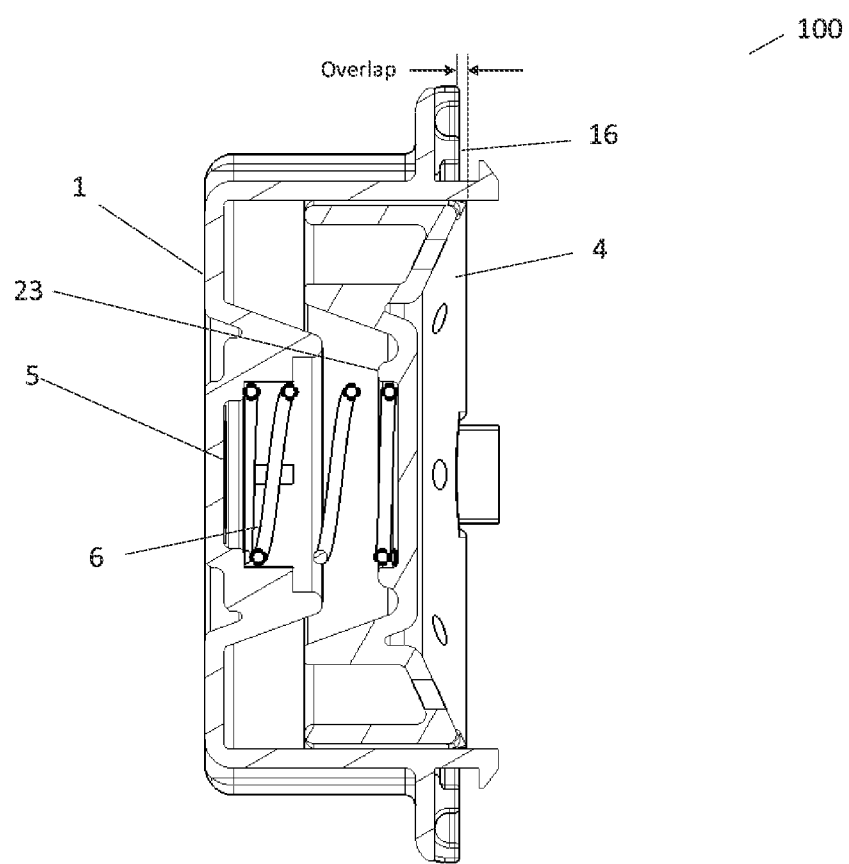
FIG. 14 shows a side cross sectional view of the spring and piston being assembled.
Figure 15:
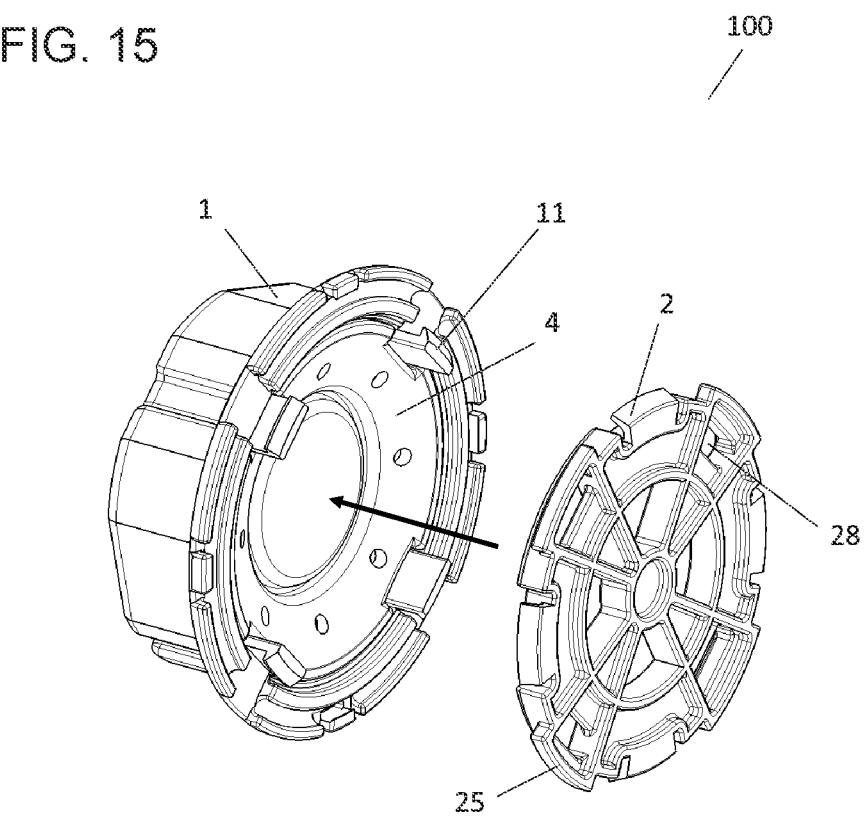
FIG. 15 shows an isometric view of a locking tab cover being assembled.
Figure 16:
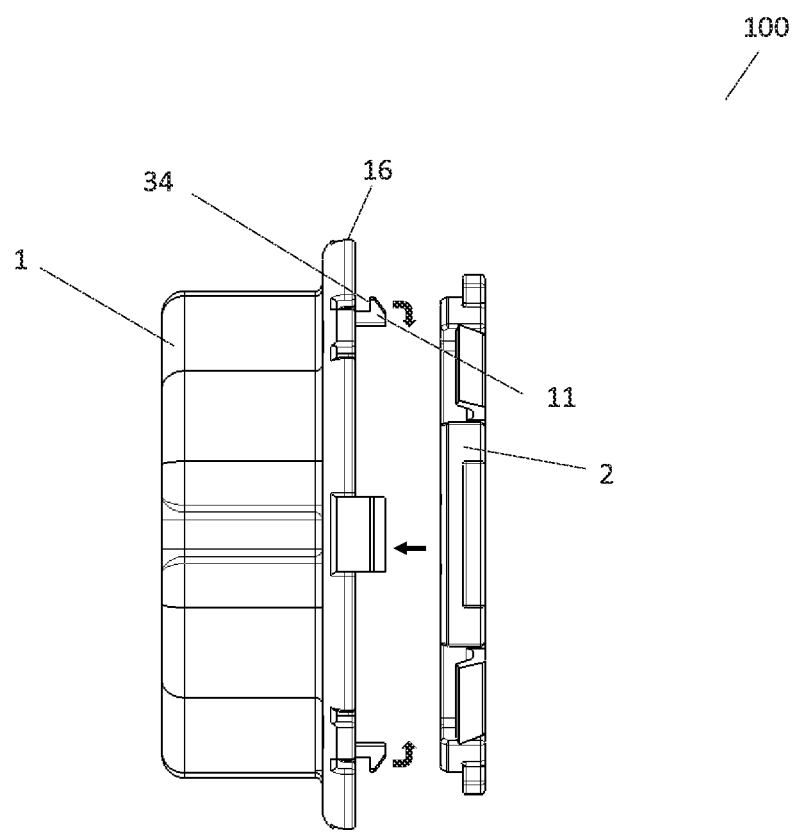
FIG. 16 shows a side view of the locking tab cover being assembled.
Figure 17:
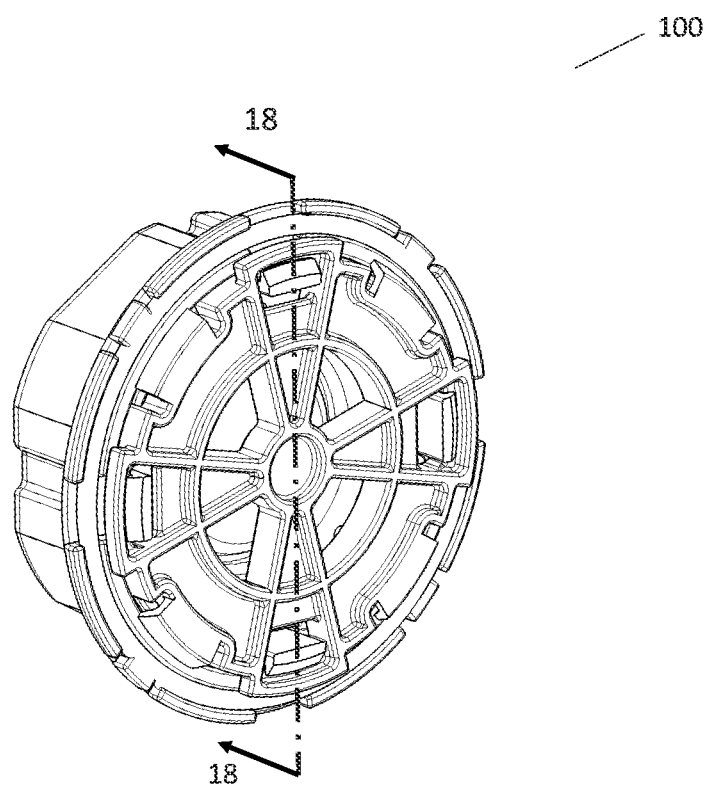
FIG. 17 shows an isometric view of the locking tab cover assembled.
Figure 18:
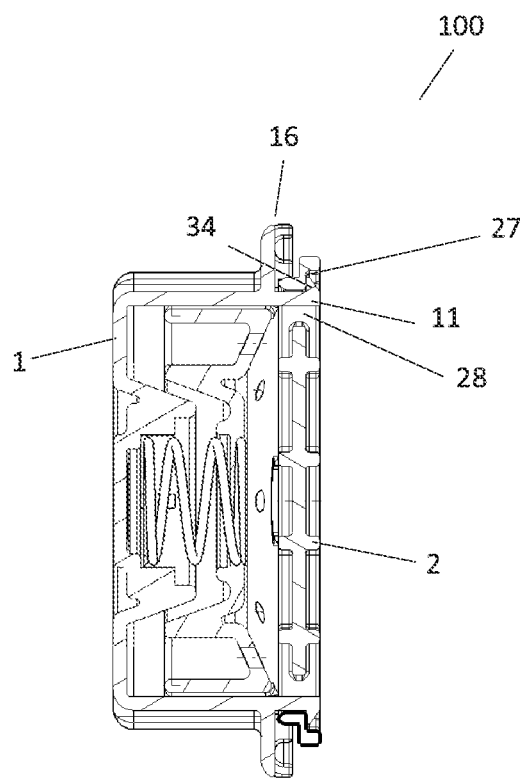
FIG. 18 shows a cross sectional side view of the locking tab cover assembled.
Figure 19:
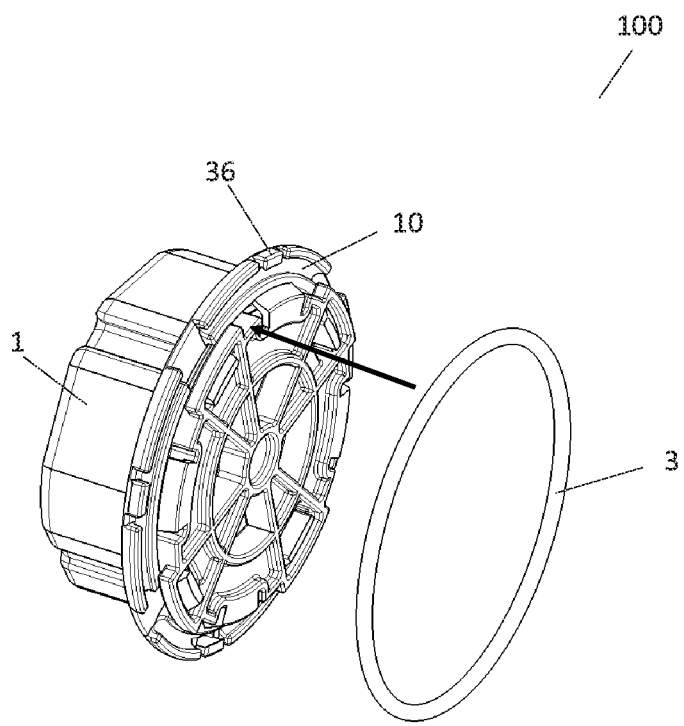
FIG. 19 shows an isometric view of an O-ring being assembled.
Figure 20:
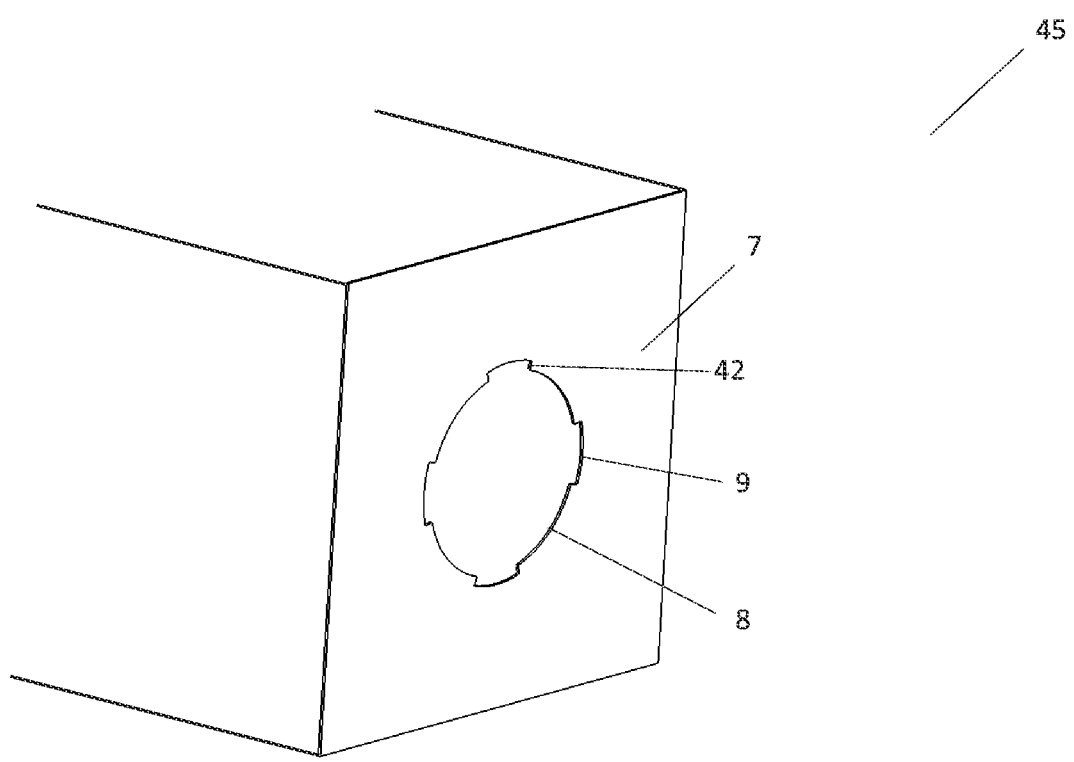
FIG. 20 shows an isometric view of a battery pack compartment of the equalization shutoff valve.
Figure 21:
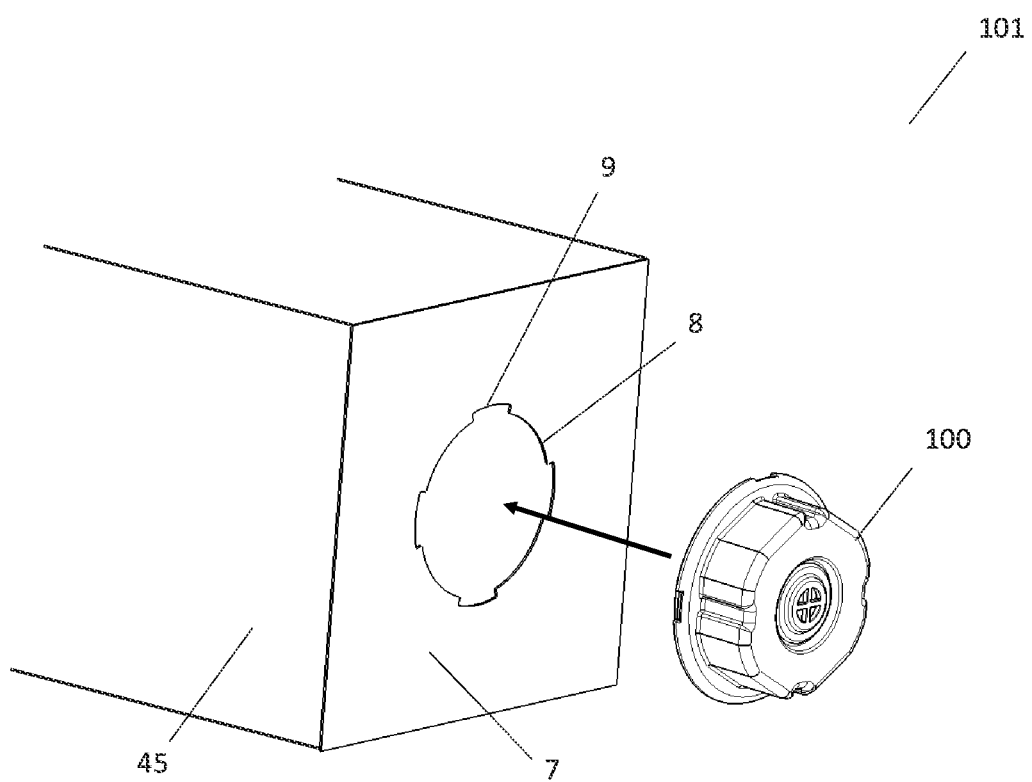
FIG. 21 shows an isometric view of the equalization shutoff valve being installed.
Figure 22:
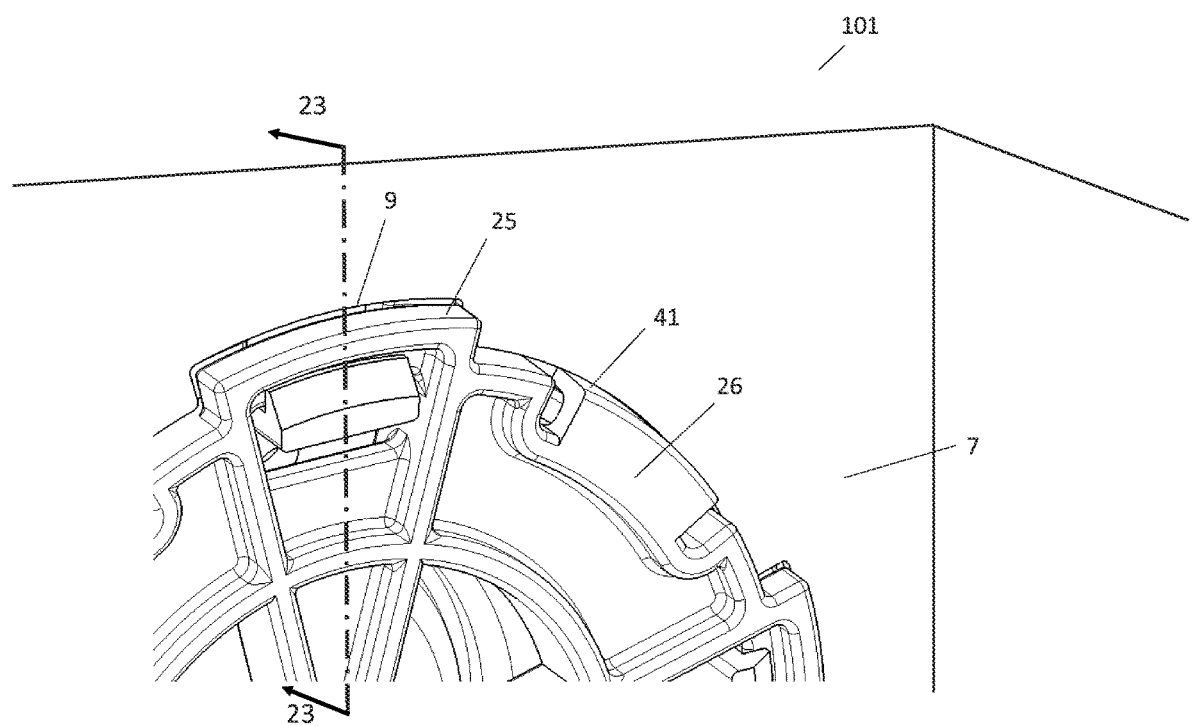
FIG. 22 shows an isometric view of the equalization shutoff valve being installed.
Figure 23:
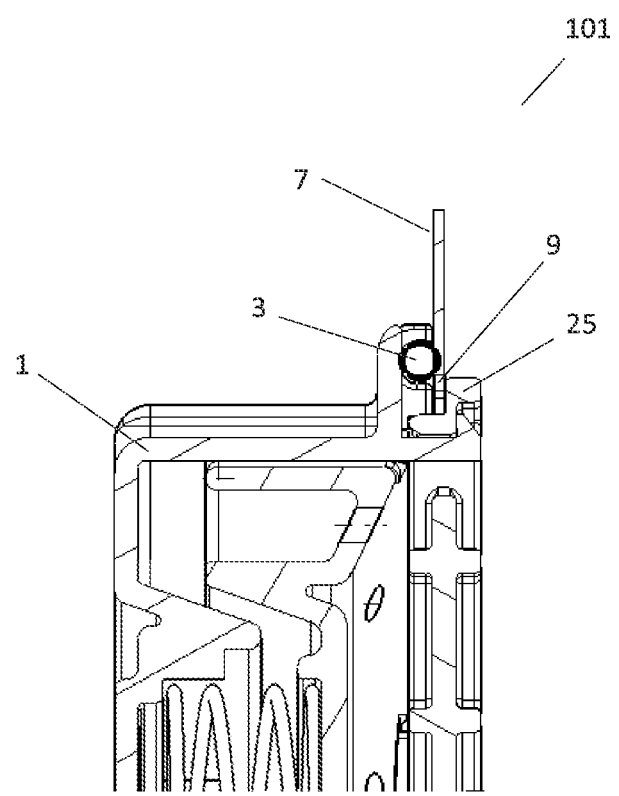
FIG. 23 shows a cross-sectional side view of the equalization shutoff valve being installed.
Figure 24:
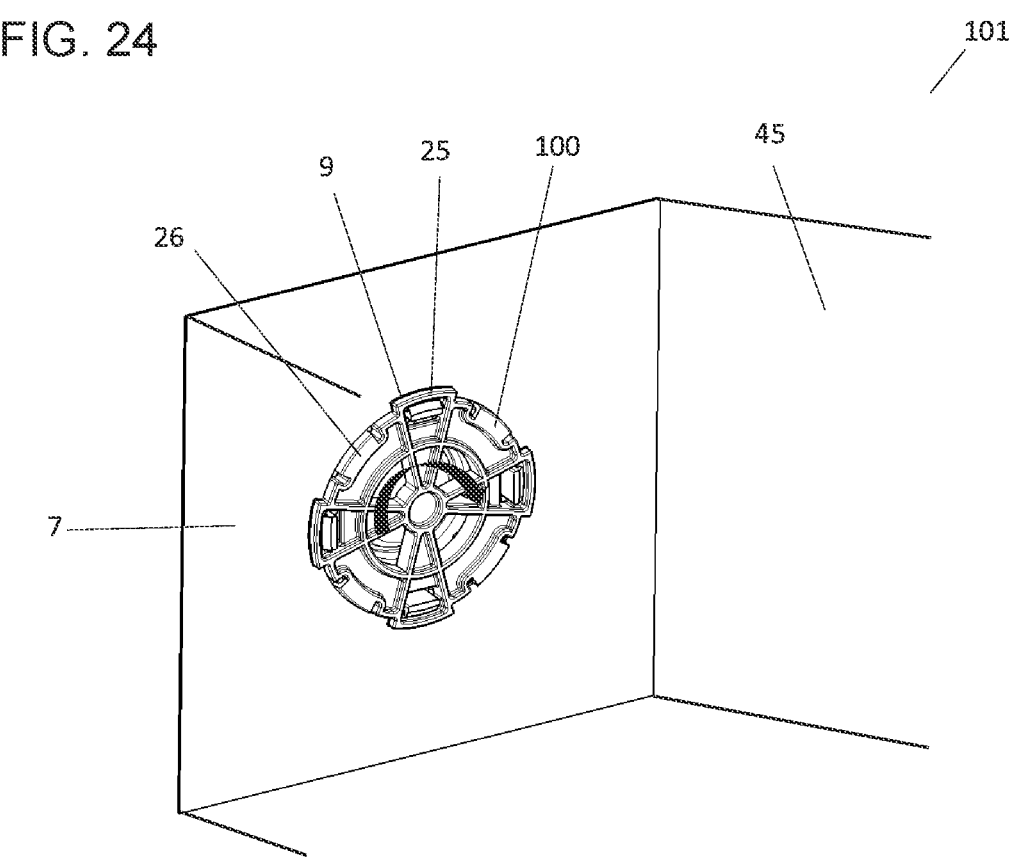
FIG. 24 shows an isometric view of the equalization shutoff valve being installed.

FIG. 10 shows the membrane which comprises an inner breathable area 29 and outer seal area 30.

FIG. 11 thru FIG. 18 show an assembly process for the equalization shutoff valve 100. The membrane 5 is placed inside the spring pocket 40 of the housing 1. The seal area 30 of the membrane 5 is located on the membrane surface 31 of the spring pocket 40 allowing the breathable area 29 of the membrane 5 to rest on the rock guard 14 of housing 1.

The spring 6 is then placed into the spring pocket 40 of the housing 1. The spring locators 13 keep the spring 6 to be located in the center of the housing 1 so as not to disturb the seal area 30 of the membrane 5. The piston 4 is placed inside the housing 1 with the piston face 17 pointing outward and the guide notches 18 of piston 4 aligned with the piston guides 12 in the housing 1. The piston 4 is mounted to slide into the housing 1 until the spring 6 meets the surface. The spring locator 23 on the piston 4 is left on the top of the piston 4 resting above the flange 16 of the housing 1 until the locking tab cover 2 is installed.

The locking tab cover 2 is then installed with the locking tabs 25 facing outward away from the piston 4. The clip ports 28 on the locking tab cover 2 are located over the retaining clips 11 on the housing 1. Once located onto position, an equal force is applied to the locking tab cover 2 forcing the retaining clips 11 of the housing 1 through the clip ports 28 on the locking tab cover 2. The retaining clips 11 flex at the flange 16 of the housing 1, and the retaining clips 11 can bend inward towards the center of the housing 1 allowing them to move through the clip ports 28 on the locking tab cover 2. Once the clipping feature 34 of the retaining clip 11 clears the clip shelf 27 of the locking tab cover 2, the clipping features 34 flex back to their original position. The clipping features 34 of the housing 1 are now secured into position by the clip shelf 27 of the locking tab cover 2.

The O-ring 3 is then placed into the O-ring groove 10 on the housing 1 with pressure applied to the O-ring 3 at the O-ring retainers 36. The pressure forces the O-ring 3 under the edge of the O-ring retainer 36 holding it in place until the equalization shutoff valve is installed.

FIG. 19 thru FIG. 26 show the installation of the equalization shutoff valve 100 into a battery pack panel 7.

The battery pack panel 7 is a completely sealed battery pack compartment within an electrical vehicle. The battery pack panel 7 has an installation port 8 and a set of locking slots 9.

The equalization shutoff valve 100 is installed into the battery pack panel 7 from the outside of the battery pack compartment 45. The equalization shutoff valve 100 is placed into the installation port 8 in the battery pack panel 7 with the O-ring 3 side of the equalization shutoff valve 100 facing the exterior side of the battery pack panel 7 with the locking tabs 25 on the equalization shutoff valve 100 aligned with the locking tabs 9 of the battery pack panel 7. The outer surface 41 of the anti-rotation tab 26 flexes away from the panel 7 as the equalization shutoff valve 100 is pushed into the battery pack panel 7 until the O-ring 3 comes into contact with the external surface of the battery pack panel 7. Once the O-ring 3 of the equalization shutoff valve 100 contacts the battery pack panel 7, additional force is required to compress the O-ring 3 at the equalization shutoff valve 100, and the equalization shutoff valve 100 is rotated 45 degrees (clockwise) within the installation port 8 of the battery pack panel 7.

The anti-rotation tabs 26 remain flexed until the equalization shutoff valve 100 has rotated 45 degrees and anti-rotation tabs 26 align with the locking slots 9 of the battery pack panel 7 at which they snap back to their original positions pushing the outer surface 41 of the anti-rotation tabs 26 past the inner surface 42 of the locking slot 9. With the outer surface 41 of the anti-rotation tabs 26 extending past the outer diameter of the installation port 8 in the battery pack panel 7, the equalization shutoff valve 100 can not rotate out of its locked position within the battery pack panel 7 without the anti-rotation tabs 26 being flexed from inside the battery pack compartment 45.

Figure 25:
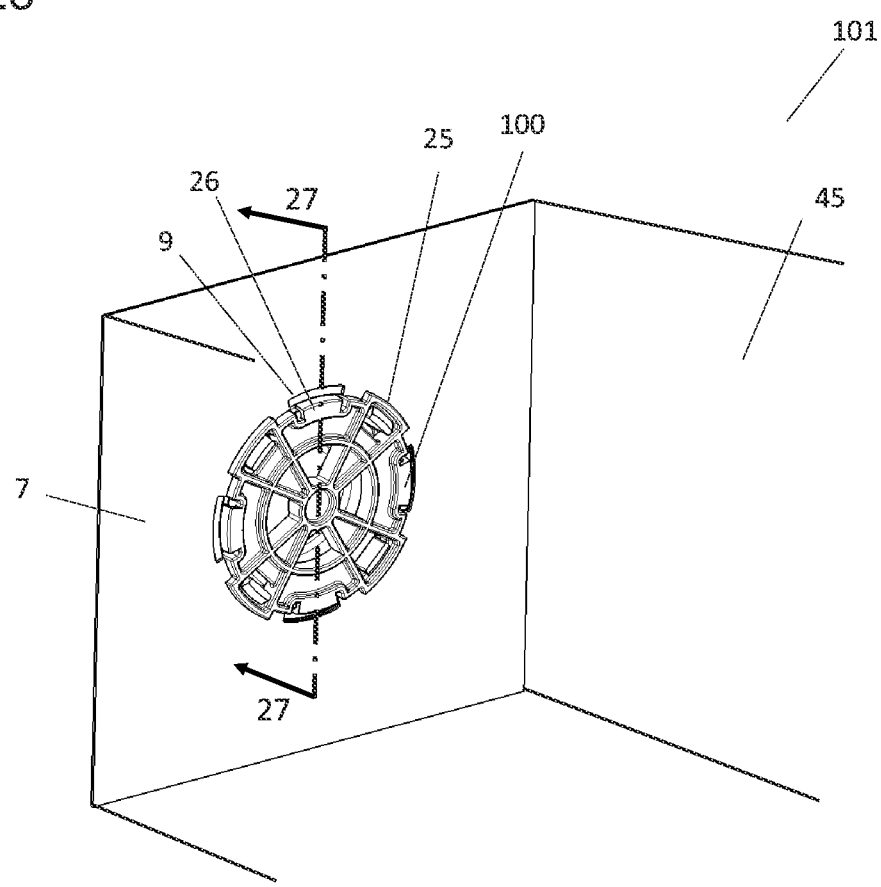
FIG. 25 shows an isometric view of the equalization shutoff valve being installed.
Figure 26:
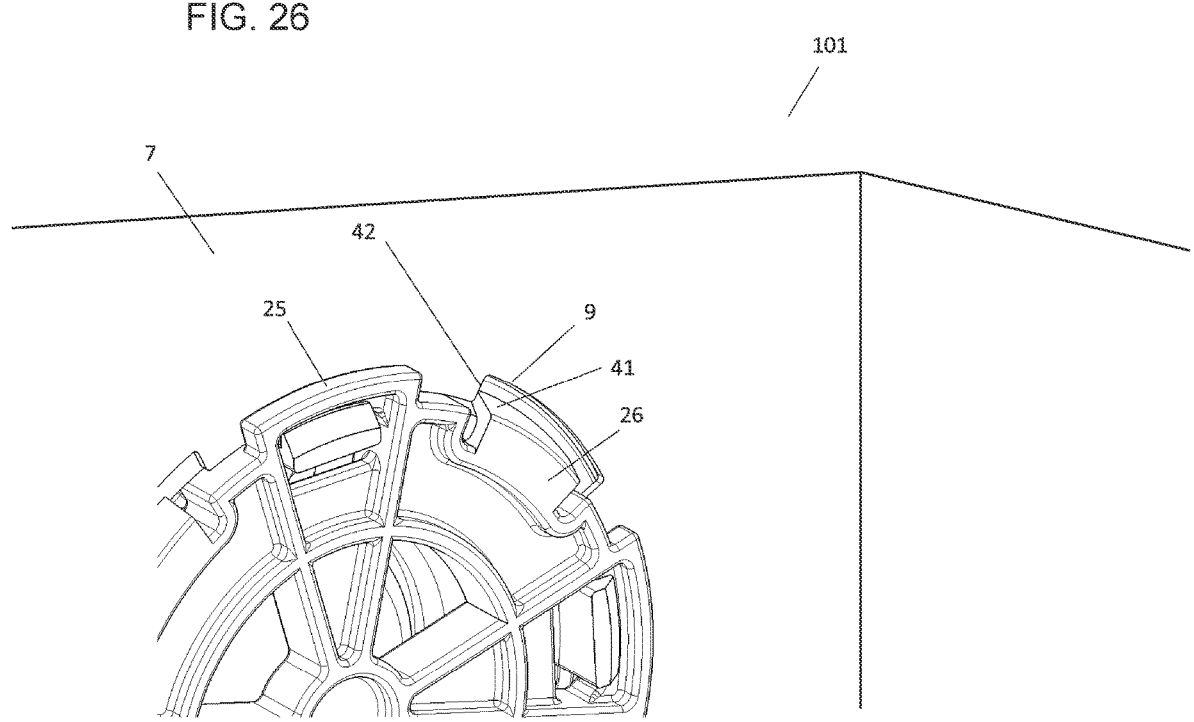
FIG. 26 shows an isometric view of the equalization shutoff valve being installed.
Figure 27:
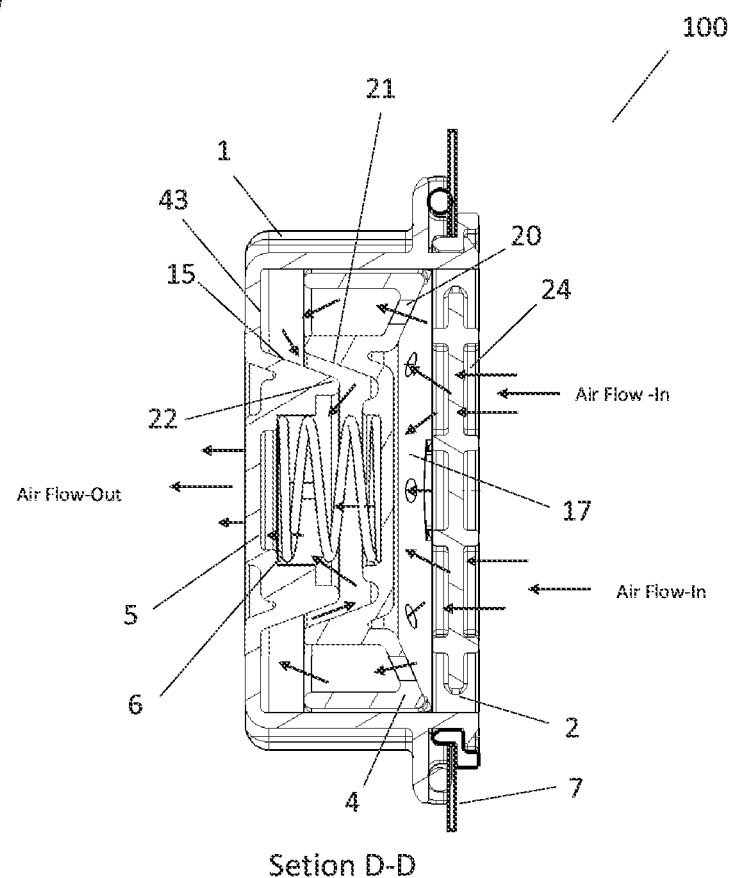
FIG. 27 shows a cross-sectional side view of the equalization shutoff valve under normal air pressure.

FIG. 27 is a sectional view taken along 27-27 in FIG. 25 showing how air flows through the equalization shutoff valve 100 to equalize the air pressure inside the battery pack compartment 45 with the air pressure outside the battery pack compartment 45.

Figure 28:
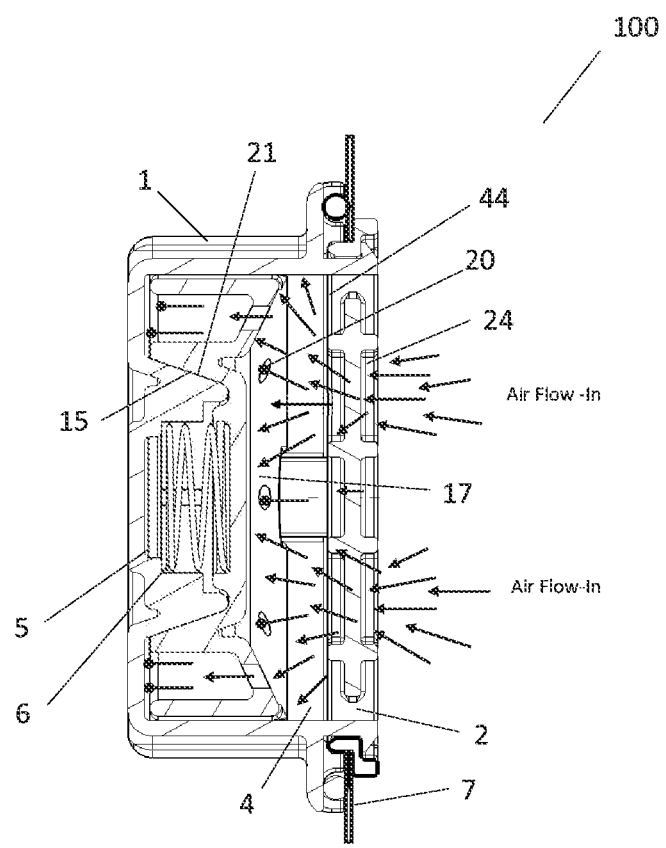
FIG. 28 shows a cross-sectional side view of the equalization shutoff valve under high air pressure.

As shown in FIG. 28, which is a sectional view similar to FIG. 27, air flows from the inside of the battery pack compartment 45 through the flow ports 24 in the locking tab cover 2 into the housing 1. Inside the housing 1, the air passes through the flow ports 20 on the piston face 17 of the piston 2. The air flow hits the rear surface of the housing 1 causing the air flow to turn and flow up the seal surface 15 between the cone seal 22 of the housing 1 and the seal surface 21 of the piston 4. In a normal pressure, air remains inside the housing and does not flow through the spring 6 and out of the housing 1 through the membrane 5.

FIG. 28 shows how air flow is shutoff in the equalization shutoff valve 100 to separate the air pressure inside the battery pack compartment 45 from the air pressure outside the battery pack compartment 45. When the battery pack increases in temperature during a thermal runaway, the air pressure increases inside the battery pack compartment 45. This increase in air pressure increases the amount of air flowing into the equalization shutoff valve 100. The increased amount of air flow entering through the flow ports 24 in the locking tab cover 2 further increases air flow, and then the flow ports 20 in the piston 4 can accommodate increasing the air volume between the piston face 17 and the back surface 44 of the locking tab cover 2. The increase in the volume pressure overcomes the tension of the spring 6 causing it to compress to thereby push the piston 4 away from the locking tab cover 2.

Figure 29:
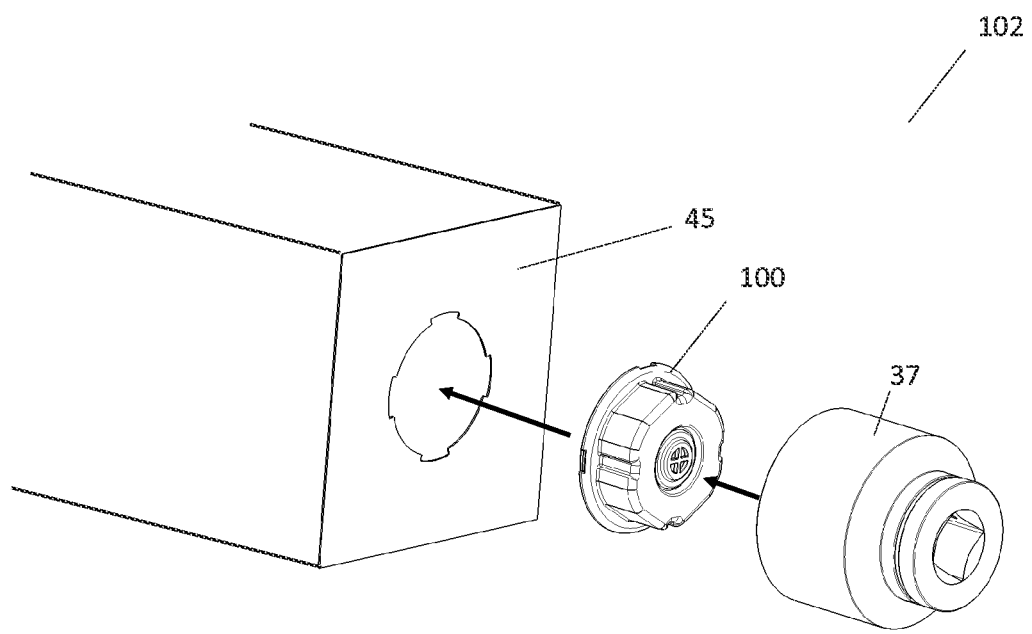
FIG. 29 shows an isometric view of the equalization shutoff valve being installed with a tool.
Figure 30:
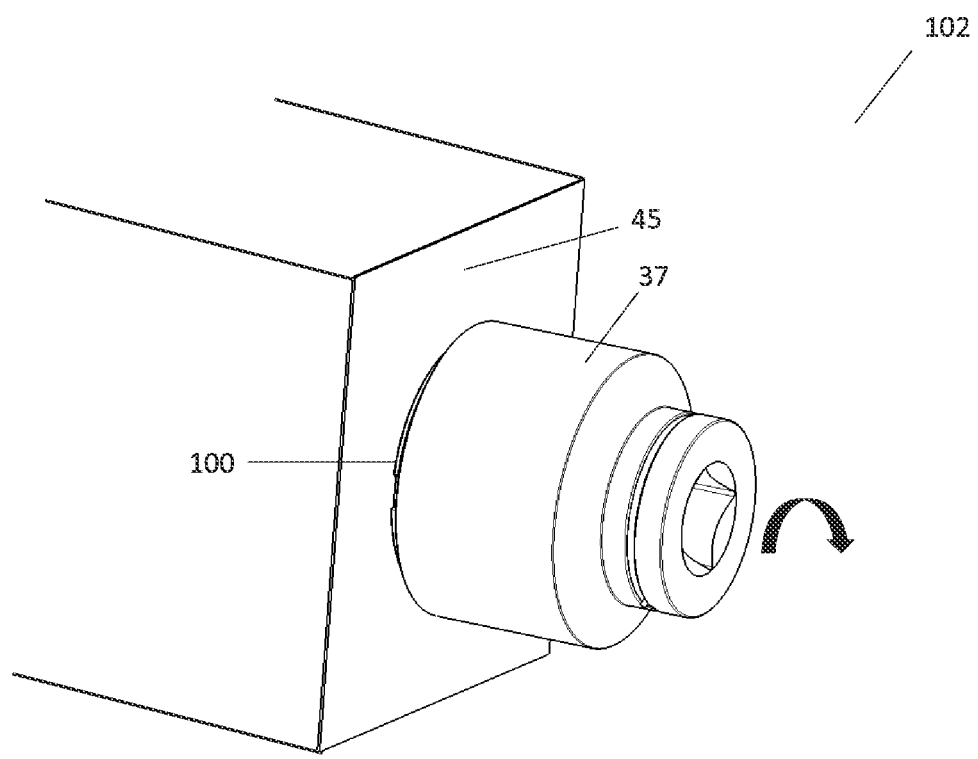
FIG. 30 shows an isometric view of the equalization shutoff valve being installed with a tool.

FIG. 29 and FIG. 30 show the equalization shutoff valve 100 being installed in the battery pack compartment 45 with the use of a socket 37.

Next, another embodiment of the invention is explained.

Figure 31:
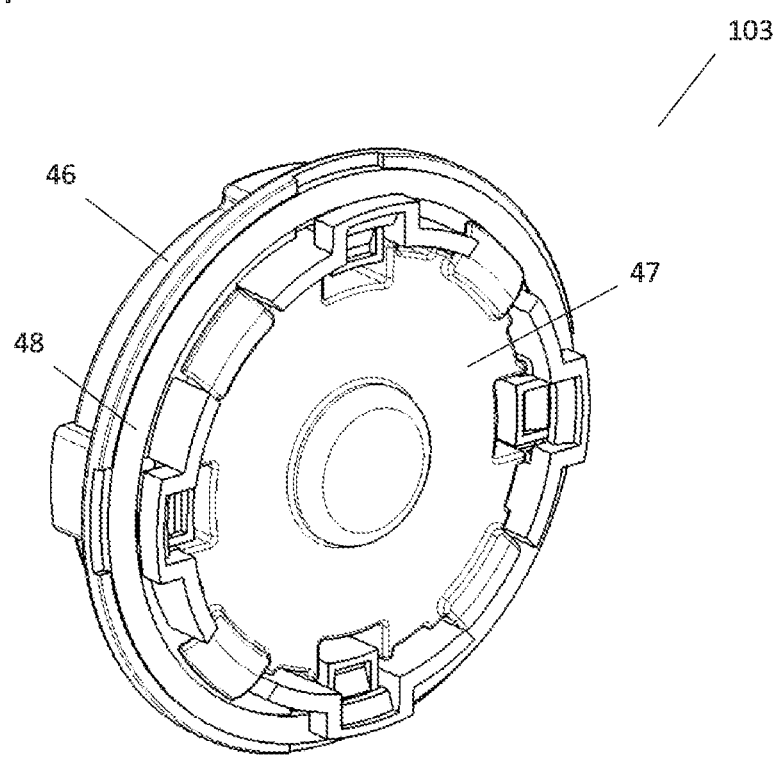
FIG. 31 shows a front isometric view of the equalization shutoff valve.
Figure 32:
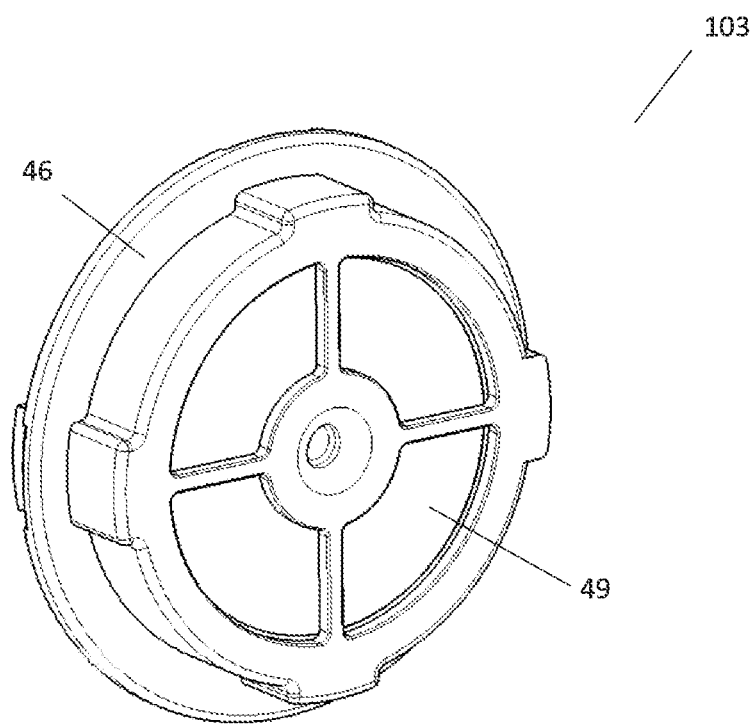
FIG. 32 shows a rear isometric view of the equalization shutoff valve.
Figure 33:
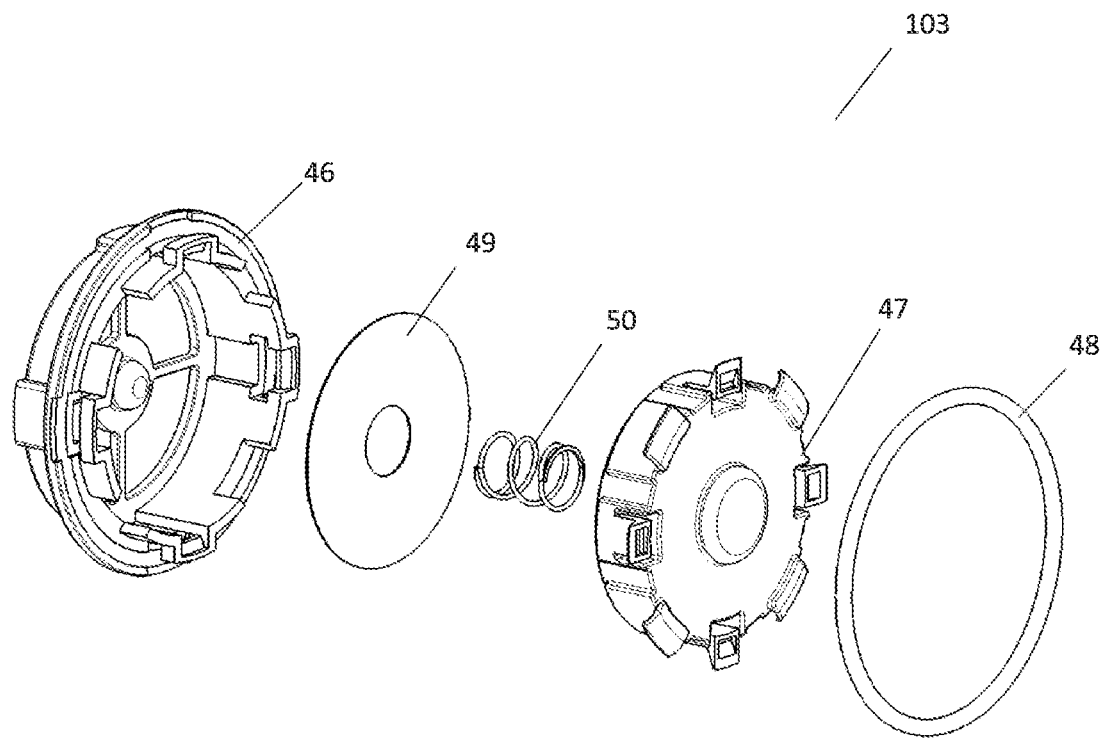
FIG. 33 shows an exploded view of the equalization shutoff valve.

FIG. 31 and FIG. 33 show the components of the equalization shutoff valve 103. These components comprises a hosing 46, a piston 47, an O-ring 48, a spring 50 and a membrane 49.

Figure 34:
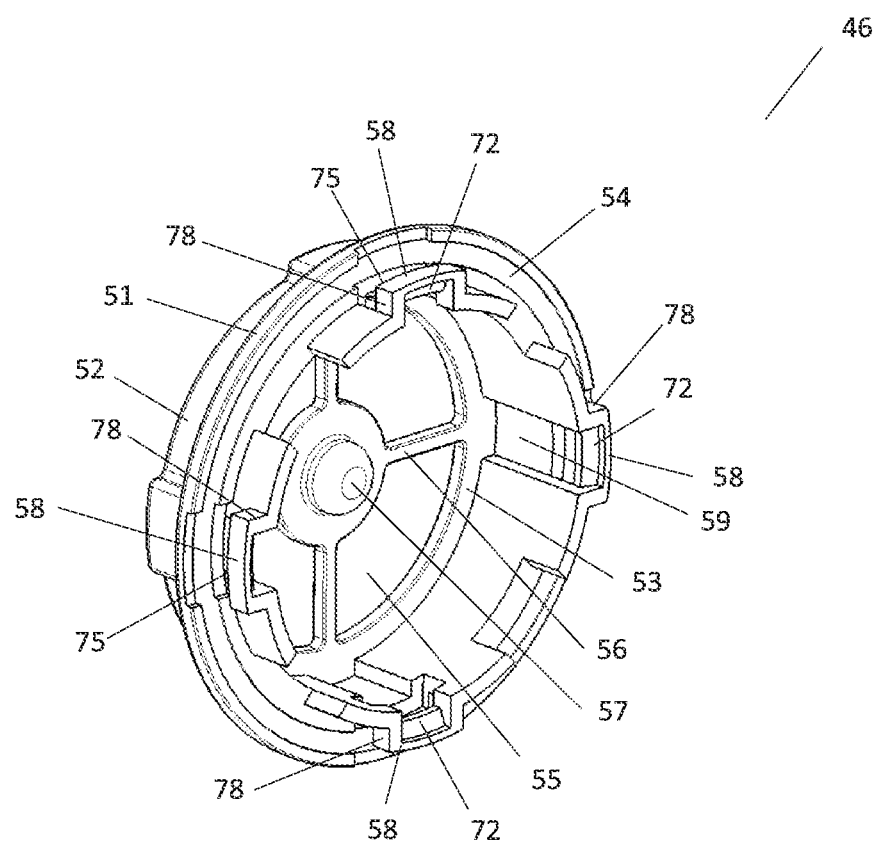
FIG. 34 shows a front isometric view of a housing.
Figure 35:
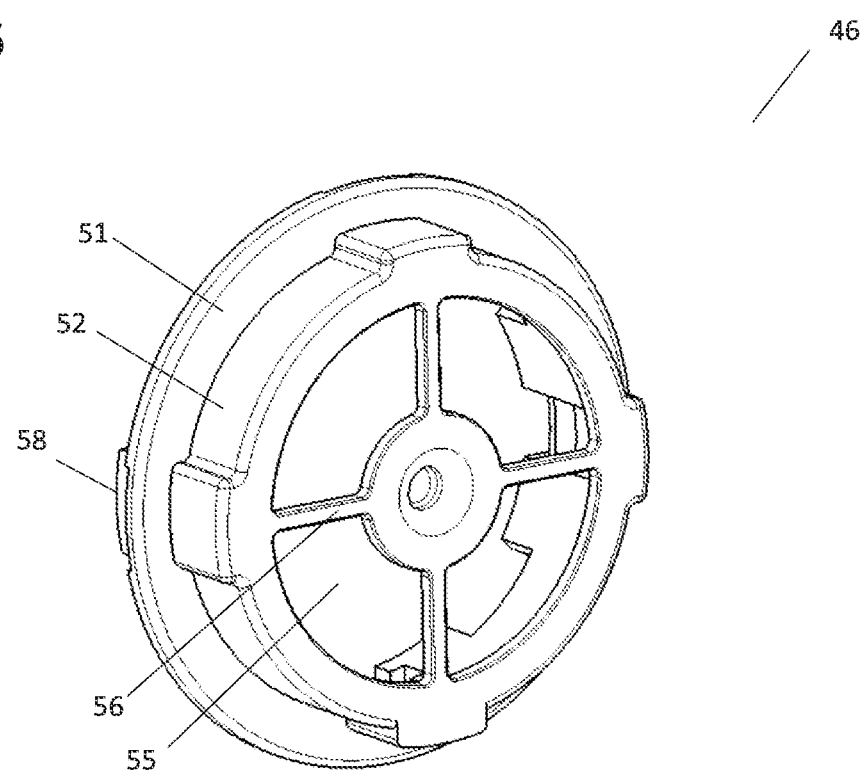
FIG. 35 shows a rear isometric view of the housing.

FIG. 34 and FIG. 35 show the housing 46 including a base 52, a flange 51 and clip retainers 58.

The base 52 has a cylindrical shape that is open on one end and closed on the other end. The closed end has a rear surface 53 with vent ports 55 located around a spring locator 57 that protrudes outwards from a circular disk in the housing 46. These vent ports 55 create a grid pattern that create a rock guard 56.

The flange 51 sits on the open end of the base housing 46 extending perpendicular from the center of the tubular base 52. An O-ring groove 54 is located on the face of the flange 51.

The clip retainers 58 are located at the end of guide channels 59 that run along the inner surface of the base 52 parallel to the axis of the tubular structure from the closed end of the base 52 to above the top surface of the flange 51. Locking tabs 78 extending outward from the center of the tubular structure project from the ends of the clip retainers 58 over the O-ring groove 54 surfaces.

Figure 36:
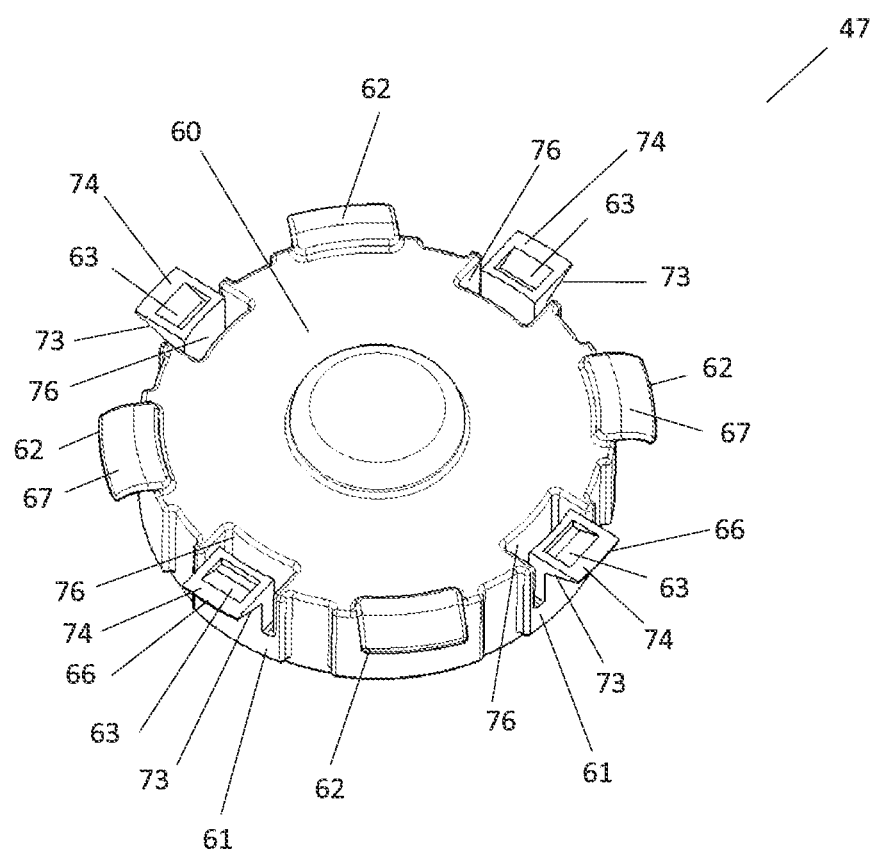
FIG. 36 shows a front isometric view of a piston.
Figure 37:
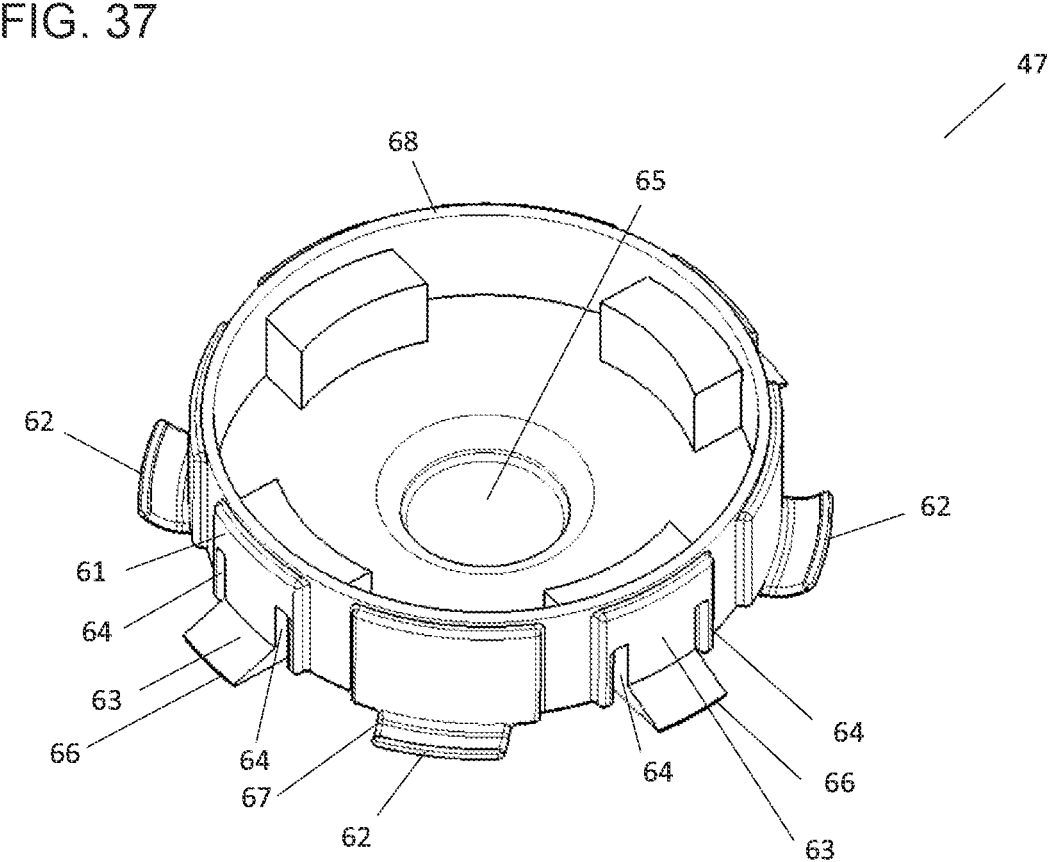
FIG. 37 shows a rear isometric view of the piston.

FIG. 36 and FIG. 37 show the piston 47 which comprises a cylindrical tube that is open on one end and closed on the other end with a piston face 60. A circular tube-shaped spring locator 65 on the piston face 60 protrudes downward away from the open end of the piston 47. Anti-rotational tabs 62 protrude from the piston face 60 extending outward over the cylindrical side walls of the piston 47 positioned around its circumference. Clip pockets 76 are located between the anti-rotational tabs notching into the piston face 60 without extending to the open end of the piston 47.

Retaining clips 63 are located within the clip pockets 76 extending upward tangent to the cylindrical walls of the piston 47 to the piston face 60. The top surface 74 of the retaining clip 63 extends outward over the cylindrical wall of the piston 47. Flex notch 64 is cut on both sides of the retaining clip 63 to allow the retaining clip 63 to flex inward into the clip pocket 76 during assembly. Guide ribs 61 protrude outward from the cylindrical wall of the piston 47 in front of the clip pocket 76 running from the top to the bottom of the piston 47.

Figure 38:
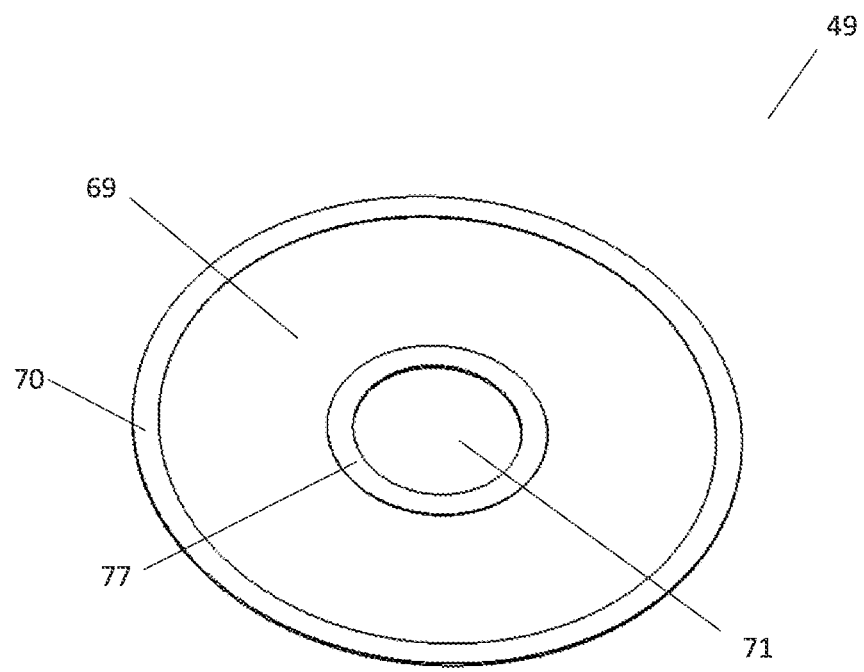
FIG. 38 shows an isometric view of a membrane.
Figure 39:
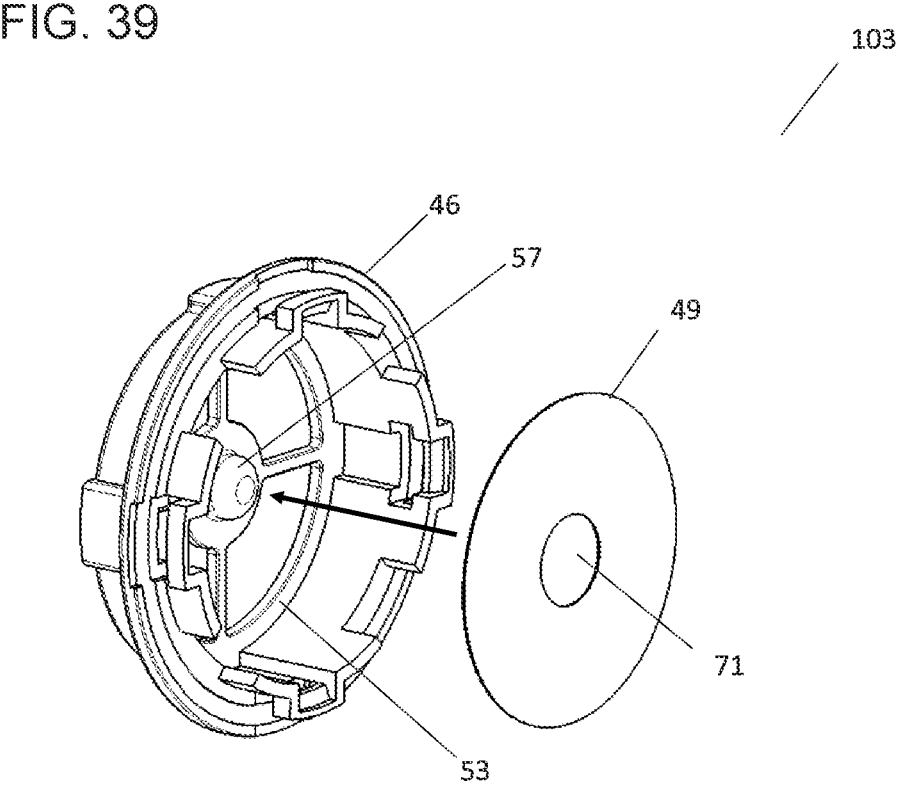
FIG. 39 shows an exploded isometric view of the membrane being assembled.
Figure 40:
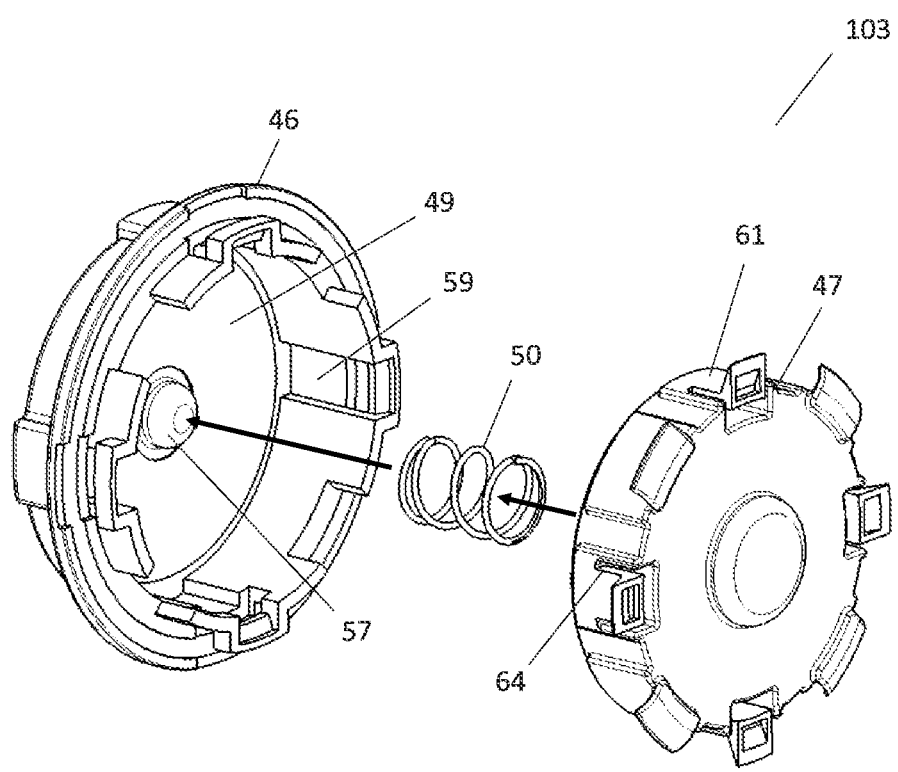
FIG. 40 shows an exploded isometric view of the spring and piston being assembled.
Figure 41:
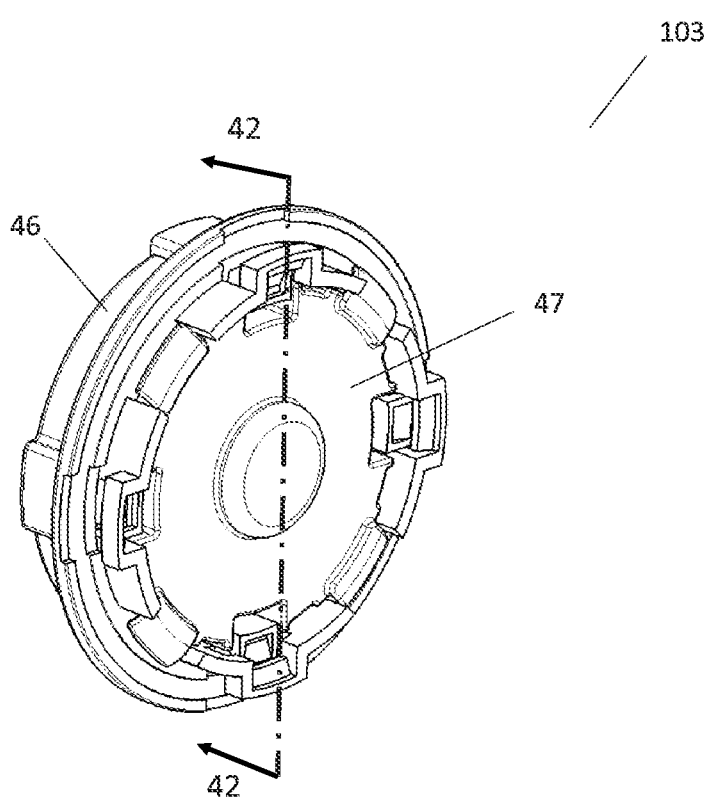
FIG. 41 shows an isometric view with the spring and piston assembled.
Figure 42:
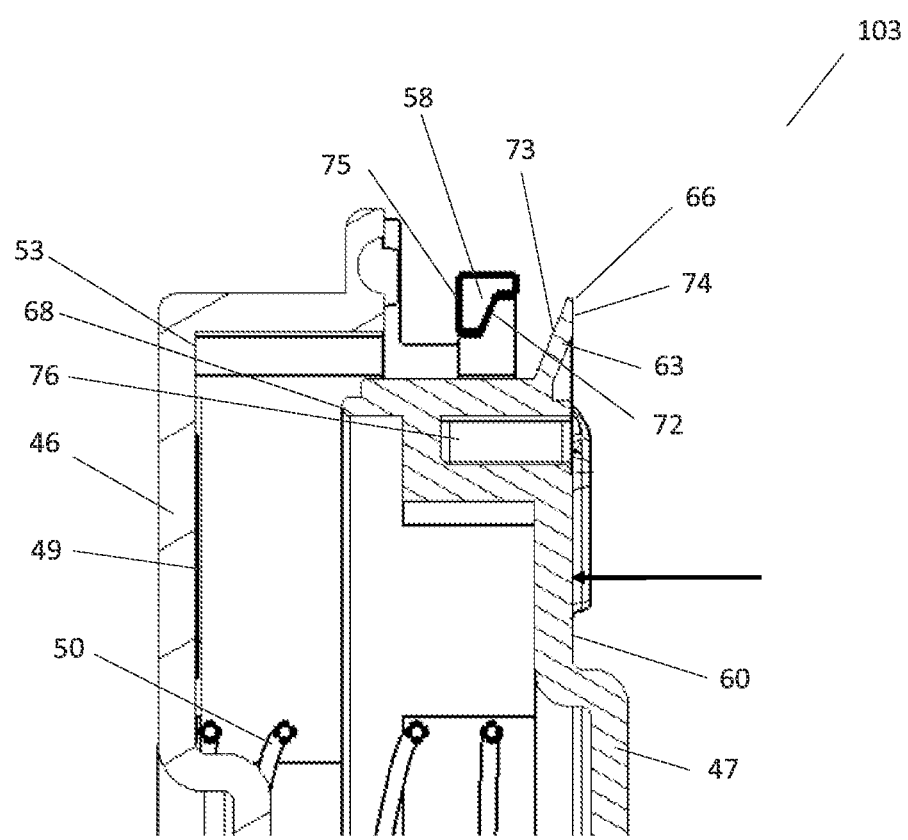
FIG. 42 shows a partial cross-sectional view of the spring and piston being assembled.
Figure 43:
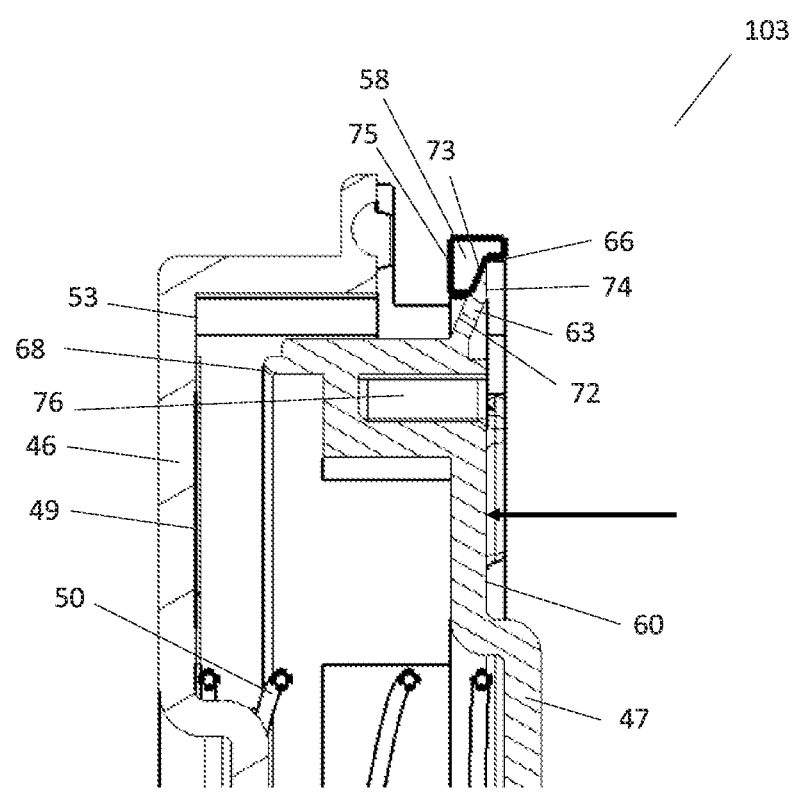
FIG. 43 shows a partial cross-sectional view of the spring and piston being assembled.
Figure 44:
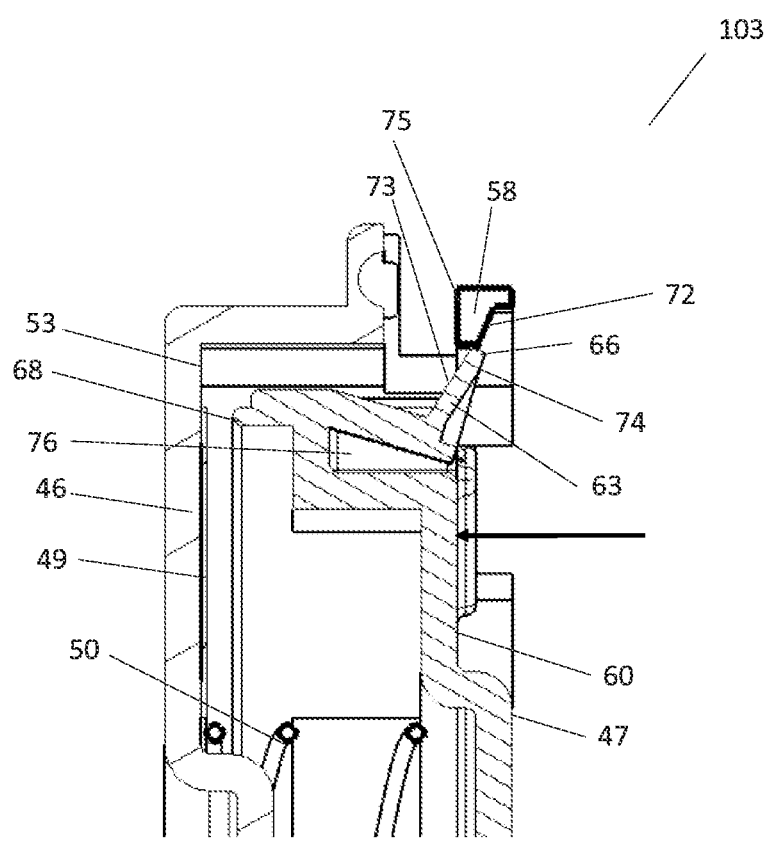
FIG. 44 shows a partial cross-sectional view of the spring and piston being assembled.
Figure 45:
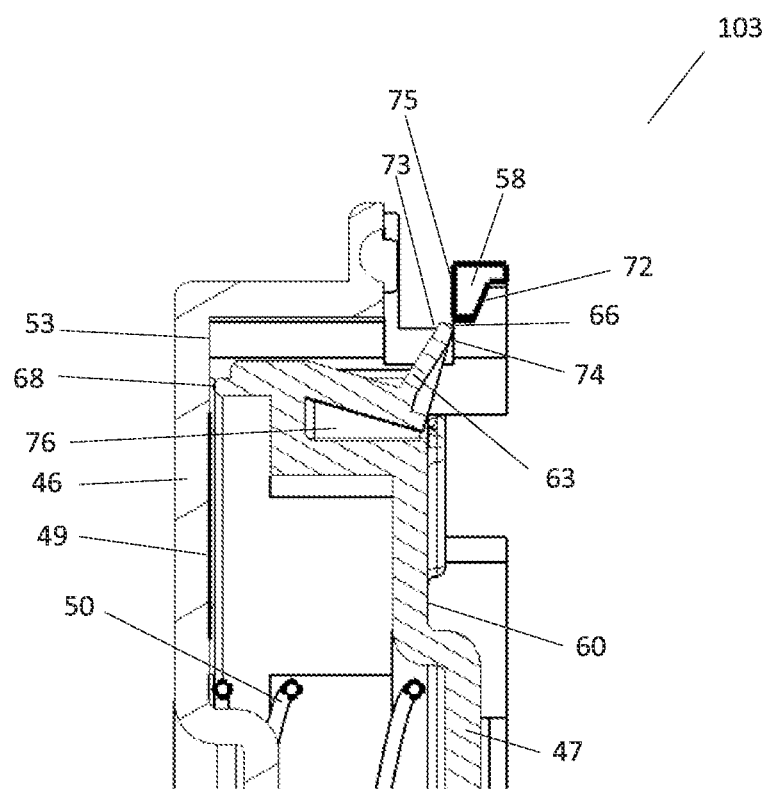
FIG. 45 shows a partial cross-sectional view of the spring and piston being assembled.
Figure 46:
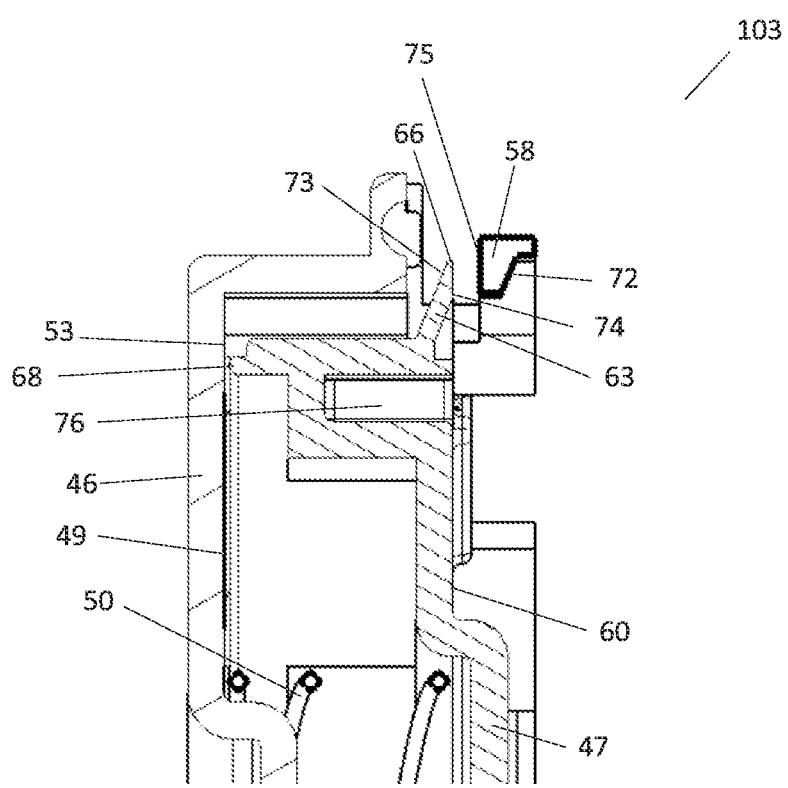
FIG. 46 shows a partial cross-sectional view of the spring and piston being assembled.
Figure 47:
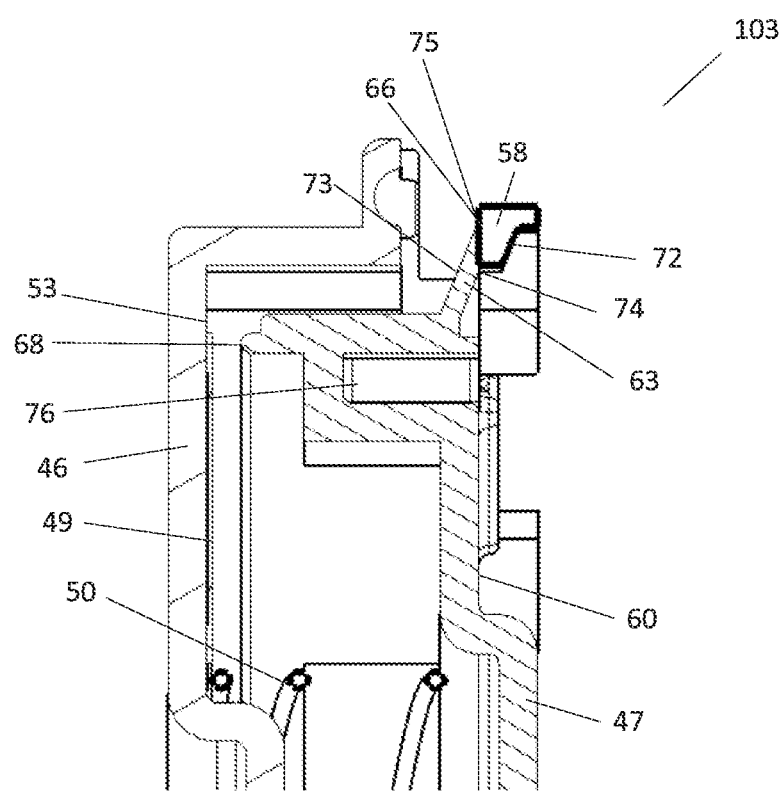
FIG. 47 shows a partial cross-sectional view of the spring and piston being assembled.
Figure 48:
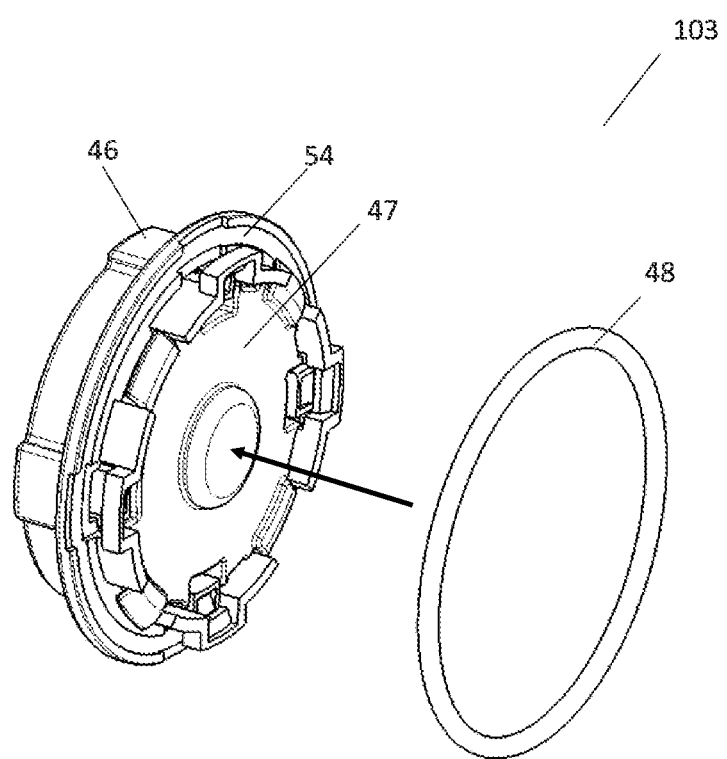
FIG. 48 shows an exploded isometric view of the O-ring being assembled.
Figure 49:
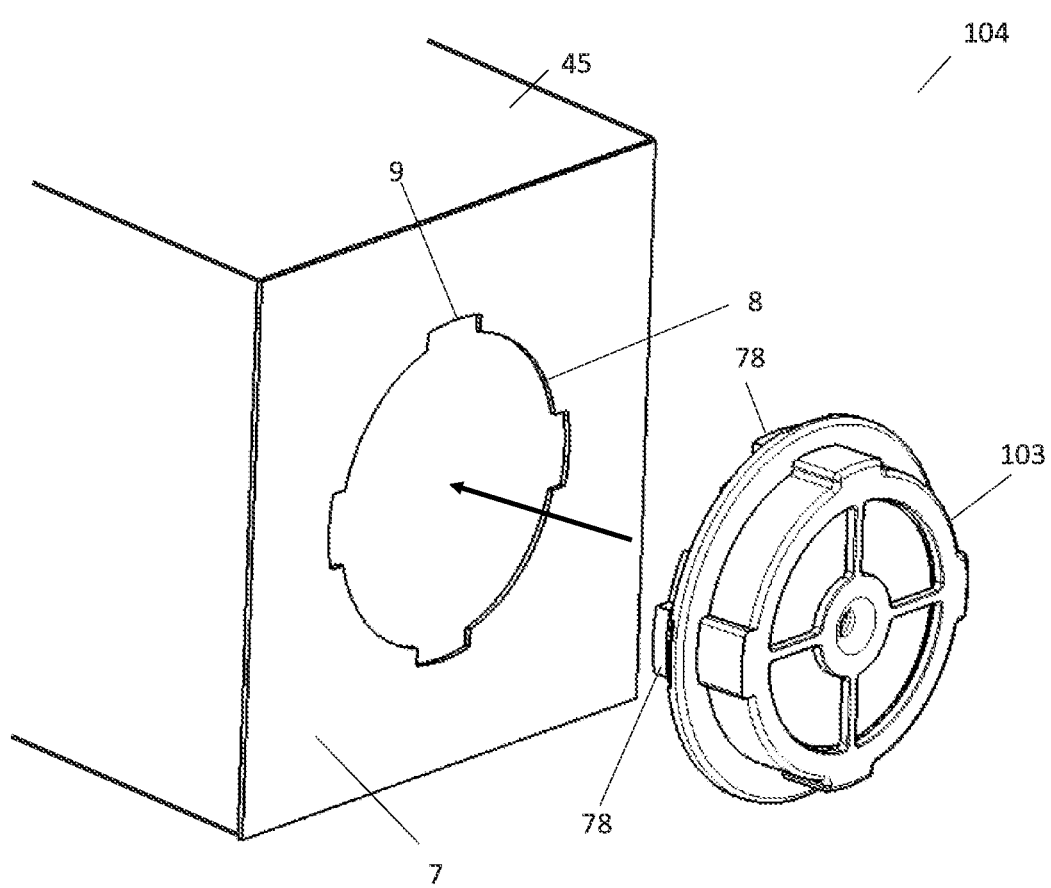
FIG. 49 shows an exploded isometric view of the equalization shutoff valve being installed.
Figure 50:
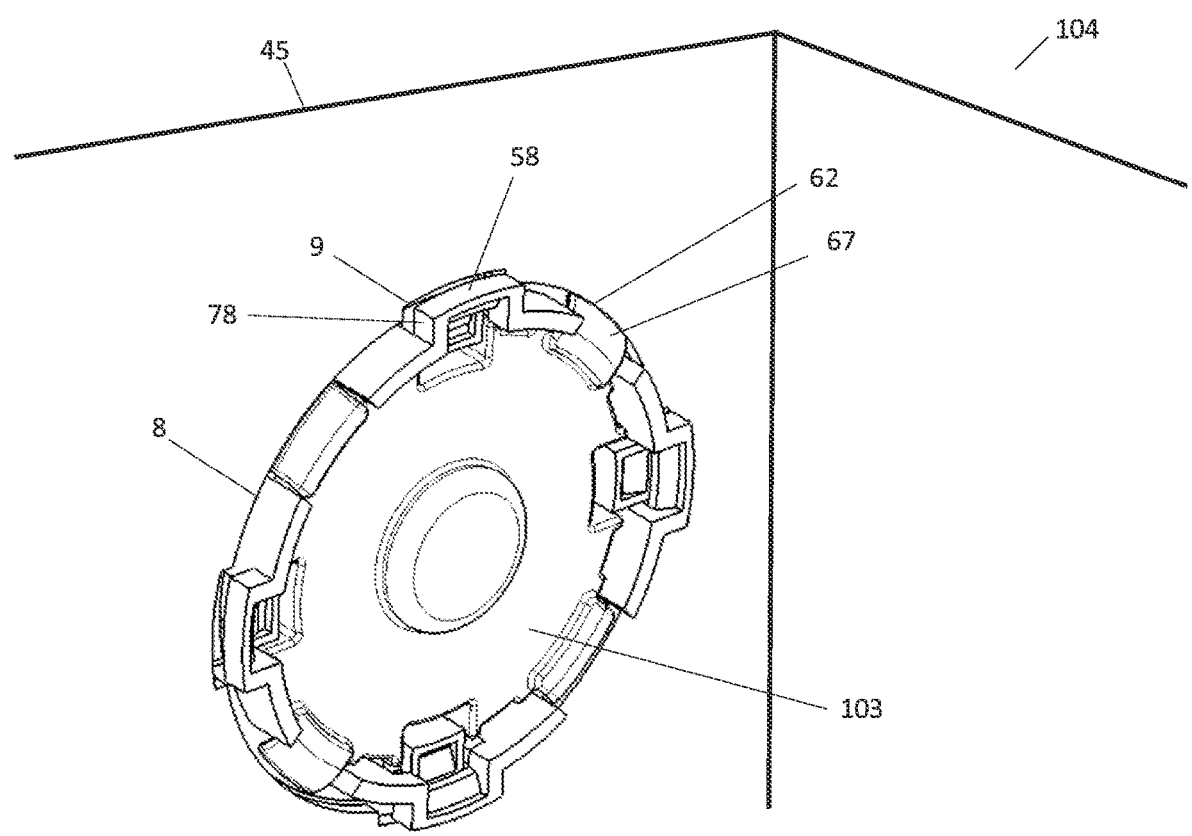
FIG. 50 shows an isometric view of the equalization shutoff valve being installed.
Figure 51:
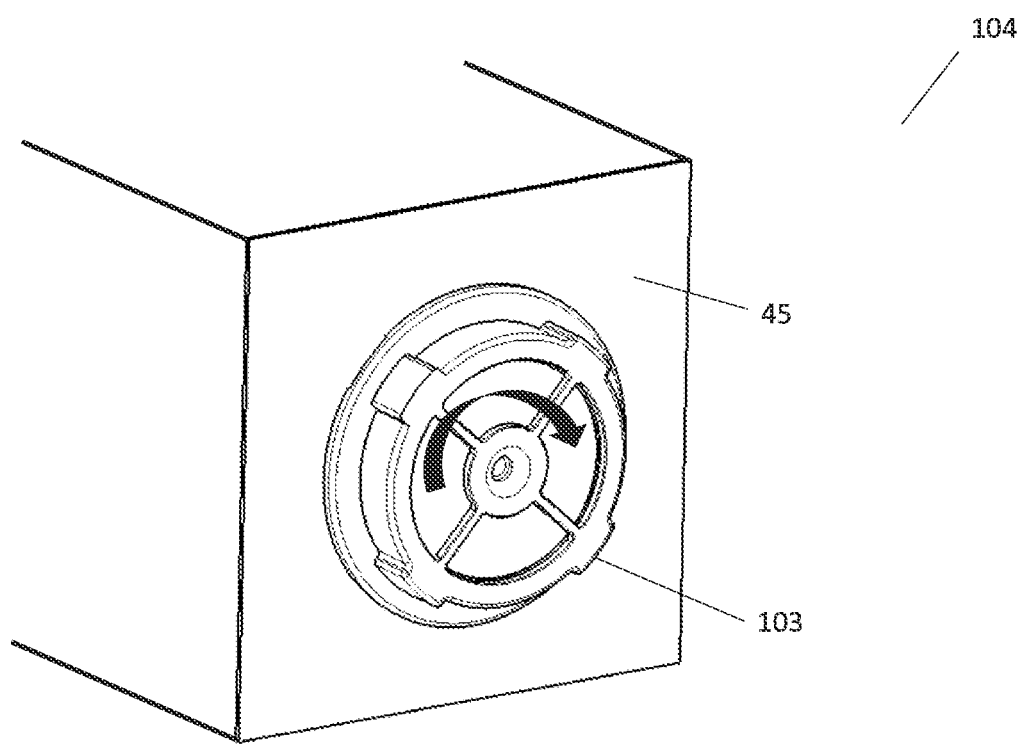
FIG. 51 shows an isometric view of the equalization shutoff valve being installed.
Figure 52:
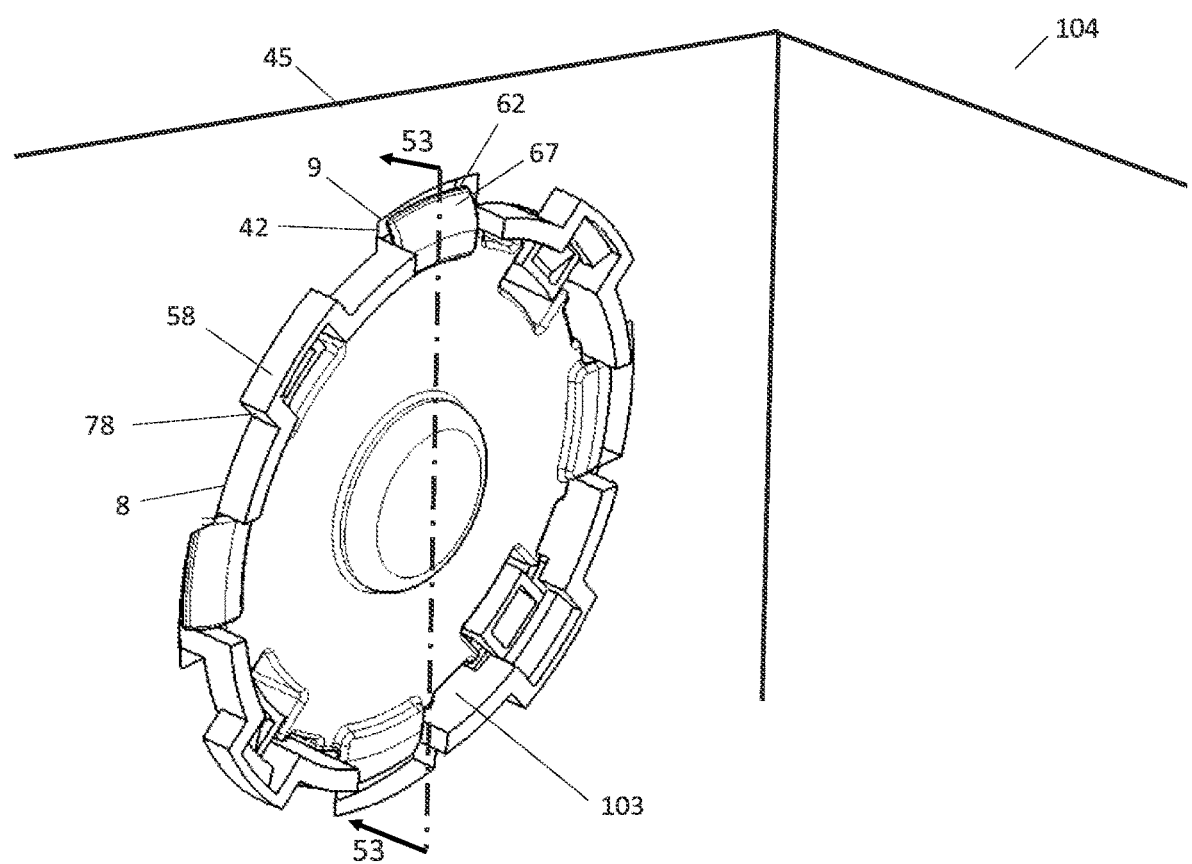
FIG. 52 shows an isometric view of the equalization shutoff valve being installed.

FIG. 38 shows the membrane 49 which comprises a breathable area 69, an outer seal area 70 and inner seal area 7

FIG. 39 thru FIG. 48 show the assembly process for the equalization shutoff valve 103. The membrane 49 is placed inside the housing 46 with the membrane locator 71 of the membrane 49 positioned over the spring locator 57 in the housing 46. The inner seal area 77 and the outer seal area 70 of the membrane 49 pressed to the rear surface 53 of the housing 46 allow the breathable area 69 of the membrane 49 to rest on the rock guard 56 of housing 46.

The spring 50 is then placed into the housing 46 on the spring locator 57 that keeps the spring 50 centrally located with the housing 49 so as not to disturb the breathable area 69 of the membrane 49. The piston 47 is placed onto the spring 50 positioned in the spring locator 65 in the piston 47. The piston 47 is then rotated about the spring 50 in order to align the guide ribs 61 of the piston with the guide channels 59 of the Housing 46. With the guide ribs 61 aligned with the guide channels 59, pressure is applied to the piston face 60. As the pressure is applied to the piston face 60, the spring 50 is compressed allowing the piston 47 to move inside the housing 46.

The piston 47 moves into the housing until the angled surfaces 73 of the retaining clips 63 contact the angled surface 72 on the clip retainer 58. Once contact is made, additional pressure on the piston face 60 is required. This additional pressure forces the retaining clips 63 to flex inward into the clip pockets 76 allowing the clip edge 66 on the retaining clips 63 to move past the clip retainers 58. Once the edge seal 68 on the piston 47 contacts the rear surface 53 of the housing 46, the clip edge 66 on the retaining clip 63 clears the bottom surface 75 of the clip retainers on the housing 46 allowing it to flex back to its original position. With the retaining clips 63 back in its original position, pressure can be released from the piston face 60.

When the pressure is released from the piston face 60, the spring 50 pushes the piston 47 moving it away from the rear surface 53 of the housing 46. The piston 47 moves away from the rear surface 53 until the top surfaces 74 of the retaining clip 63 contact the bottom surface 75 of the clip retainer 58 securing the piston 47 within the housing 46. The piston 47 is secured to the housing 46 but is still free to travel within the housing 46 over the distance of the gap between the rear surface 53 of the housing 46 and the edge seal 68 of the piston 47.

The O-ring 48 is then placed into the O-ring groove 54 on the housing 46 with pressure applied to the O-ring 48. The pressure forces the O-ring 48 into the O-ring groove 54 holding it in place until the equalization shutoff Valve 103 is installed.

FIG. 49 thru FIG. 54 show the installation of the equalization shutoff valve 104 into a battery pack panel 7.

The battery pack panel 7 is a visual representation of a complete sealed battery pack compartment 45 within an electrical vehicle. The battery pack panel 7 has an installation port 8 and a set of locking slots 9.

The equalization shutoff valve 103 is installed into the battery pack panel 7 from the outside of the battery pack compartment 45. The equalization shutoff valve 103 is placed into the installation port 8 in the battery pack panel 7 with the O-ring 48 side of the equalization shutoff valve 103 facing the exterior side of the battery pack panel 7 with the locking tabs 78 on the equalization shutoff valve 103 aligned with the locking slots 9 of the battery pack panel 7. The flex surfaces 67 of the anti-rotation tabs 62 flex inward as the equalization shutoff valve 103 is pushed into the battery pack panel 7 until the O-ring 48 comes into contact with the external surface of the battery pack panel 7.

Once the O-ring 48 of the equalization shutoff valve 103 contacts the battery pack panel 7, additional force is required to compress the O-ring 48 at the equalization shutoff valve 103 so that the equalization shutoff valve 103 is rotated 45 degrees (clockwise) within the installation port 8 of the battery pack panel 7. The anti-rotation tabs 62 remain flexed until the equalization shutoff valve 103 has rotated 45 degrees and anti-rotation tabs 62 align with the locking slots 9 of the battery pack panel 7 at which time they snap back to their original position, with the flex surface 67 of the anti-rotation tabs 62 moving past the inner surface 42 of the locking slot 9.

With the flex surfaces 67 of the anti-rotation tabs 62 extending past the outer diameter of the installation port 8 in the battery pack panel 7, the equalization shutoff valve 103 cannot rotate out of its locked position within the battery pack panel 7 without the anti-rotation tabs 62 being flexed from inside the battery pack compartment 45.

Figure 53:
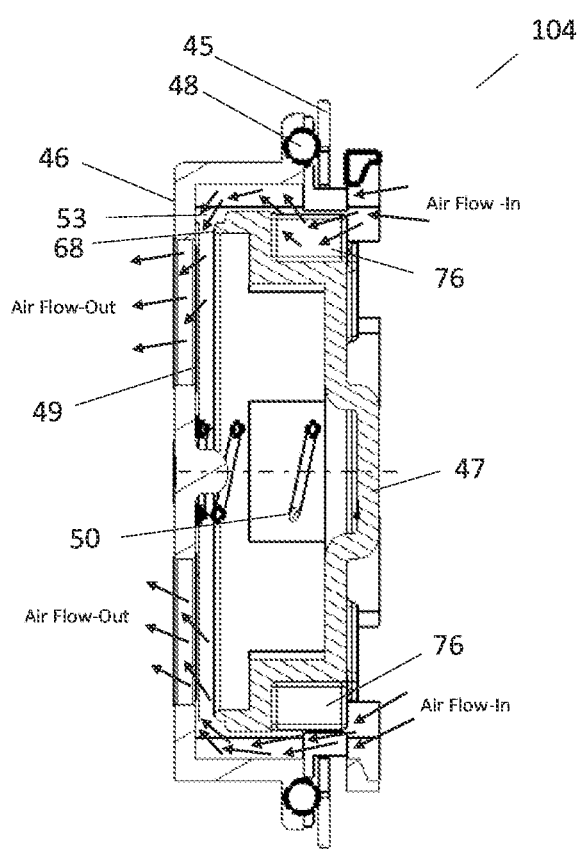
FIG. 53 shows a cross-sectional side view of the equalization shutoff valve under normal air pressure.

FIG. 53 shows how air flows through the equalization shutoff valve 103 to equalize the air pressure inside the battery pack compartment 45 with the air pressure outside the battery pack compartment 45. Air flows from the inside of the battery pack compartment 45 through the clip pockets 76 in the piston 47 into the housing 46. Inside the housing 46, the air flow is channeled around the piston 47 and onto the rear surface 53 of the housing 46. The air flow hits the rear surface 53 of the housing 46 causing the air flow between it and the edge seal 68 of the piston 47 out through the breathable area 69 of the membrane 49.

Figure 54:
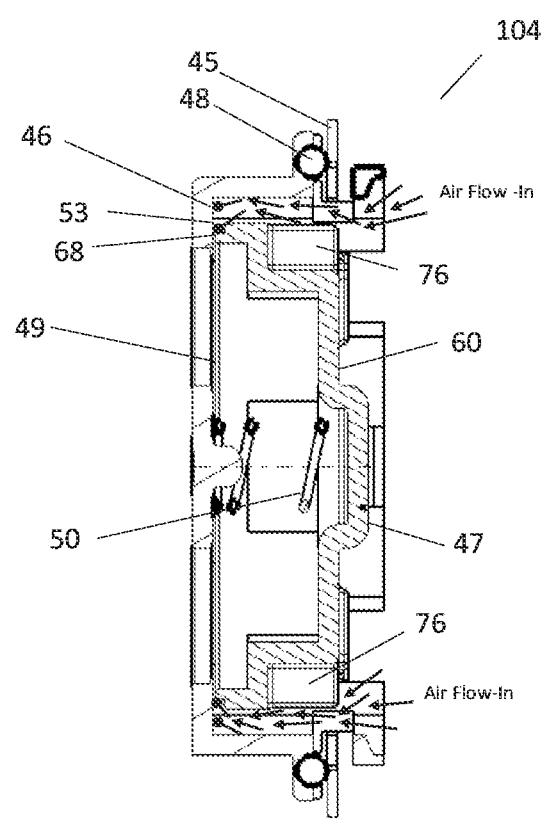
FIG. 54 shows a cross-sectional side view of the equalization shutoff valve under High air pressure.

FIG. 54 shows how air flow is shutoff in the equalization shutoff valve 103 to separate the air pressure inside the battery pack compartment 45 from the air pressure outside the battery pack compartment 45. When the battery pack increases in temperature during a thermal runaway, the air pressure increases inside the battery pack compartment 45. This increase in air pressure increases the amount of air flowing into the equalization shutoff valve 103.

The increased amount of air flow entering through the clip pockets 76 in the piston 47 causes more air flow, and then the clip pockets 76 in the piston 47 can accommodate increasing the air volume on the piston face 60. The increase in the volume pressure overcomes the tension of the spring 50 causing it to compress and push the piston 47 toward the rear surface 53 of the housing 46. Then, the air is released. When this pressure compresses the spring 50 to its minimum length, the edge seal 68 of the piston 47 returns to contact the rear surface 53 of the housing 46, and the air flow is shutoff from the breathable area 69 of the membrane 49.

While the invention is explained with reference to the specific embodiments, the embodiments are illustrative, and the invention is limited by the appended claims.

What is claimed is:

1. An equalization shutoff valve, comprising:
   a housing having a cylindrical shape with a closed end, a vent port in the closed end and an open end at a side opposite to the closed end, and including an outward extending flange around the open end, guide channels disposed inside the housing, and clip retainers formed around the open end and configured to engage a battery pack compartment,
   a piston having a cylindrical shape and disposed inside the housing, the piston having clip pockets formed around the piston, and retaining clips each being disposed in each of the clip pockets so that each retaining clip bends inwardly of the piston when being pushed inwardly, and a spring disposed between the housing and the piston to urge the piston in a direction away from the closed end of the housing, wherein the hosing with the piston and the spring therein is configured to be attached to the battery pack compartment through the clip retainers so that air flows from inside the battery pack compartment through the clip pocket, and when pressure inside the housing increases, increased pressure pushes the spring and the piston to allow air to exit from the housing.

2. An equalization shutoff valve according to claim 1, wherein the piston further includes anti-rotation tabs between the retaining clips to prevent rotation of the equalization shutoff valve relative to the battery pack compartment.

3. An equalization shutoff valve according to claim 1, further comprising a breathable membrane secured to an inside of the housing, and an O-ring attached to the housing.

\* \* \* \* \*